United States Patent
Bender et al.

(10) Patent No.: US 7,144,971 B2
(45) Date of Patent: Dec. 5, 2006

(54) POLYCARBONATES AND PHOTOCONDUCTIVE IMAGING MEMBERS

(75) Inventors: Timothy P. Bender, Port Credit (CA); H Bruce Goodbrand, Hamilton (CA)

(73) Assignee: Xerox Corporation, Stamford, CT (US)

( * ) Notice: Subject to any disclaimer, the term of this patent is extended or adjusted under 35 U.S.C. 154(b) by 107 days.

(21) Appl. No.: 10/910,816

(22) Filed: Aug. 4, 2004

(65) Prior Publication Data

US 2006/0029873 A1 Feb. 9, 2006

(51) Int. Cl.
C08G 64/00 (2006.01)

(52) U.S. Cl. ............... 528/196; 430/58.8; 430/64; 436/56; 436/72; 436/96; 528/198

(58) Field of Classification Search .......... 430/58.8, 430/64; 436/56, 72, 96; 528/196, 198
See application file for complete search history.

(56) References Cited

U.S. PATENT DOCUMENTS

| | | | |
|---|---|---|---|
| 3,121,006 A | 2/1964 | Middleton et al. .......... 96/1 |
| 4,265,990 A | 5/1981 | Stolka et al. ............. 430/59 |
| 4,555,463 A | 11/1985 | Hor et al. ................. 430/59 |
| 4,587,189 A | 5/1986 | Hor et al. ................. 430/59 |
| 4,921,769 A | 5/1990 | Yuh et al. ................. 430/64 |
| 5,473,064 A | 12/1995 | Mayo et al. .............. 540/141 |
| 5,521,043 A | 5/1996 | Listigovers et al. ........ 430/59 |
| 6,015,645 A | 1/2000 | Murti et al. ............... 430/59 |
| 6,156,468 A | 12/2000 | Wehelie et al. ............ 430/65 |
| 6,177,219 B1 | 1/2001 | Yuh et al. ................. 430/65 |
| 6,255,027 B1 | 7/2001 | Wehelie et al. ............ 430/65 |
| 6,287,737 B1 | 9/2001 | Ong et al. ............... 430/58.8 |
| 6,444,386 B1 | 9/2002 | Liu et al. .................. 430/64 |
| 2003/0152855 A1 * | 8/2003 | Drappel et al. ............ 430/60 |
| 2003/0211413 A1 | 11/2003 | Lin et al. |

OTHER PUBLICATIONS

Jin Wu et al., U.S. Appl. No. 10/369,816, filed Feb. 19, 2003 on Photoconductive Imaging Members.
Jin Wu et al., U.S. Appl. No. 10/370,186, filed Feb. 19, 2003 on Photoconductive Imaging Members.

* cited by examiner

*Primary Examiner*—Terressa Boykin
(74) *Attorney, Agent, or Firm*—Eugene O. Palazzo; Fay, Sharp, Fagan, Minnich & McKee, LLP

(57) ABSTRACT

A polycarbonate generated from the polymerization of a protected hydroxylated bisphenolic compound, a bisphenol, a monophenolic endcapping agent, a bisphenol haloformate, and a curing compound, and thereafter subjecting the obtained polymer to a reaction with an acidic compound. A hydroxylated charge transport compound may also be included in the polycarbonate.

27 Claims, No Drawings

POLYCARBONATES AND PHOTOCONDUCTIVE IMAGING MEMBERS

CROSS-REFERENCE TO RELATED APPLICATIONS

There is illustrated in copending application U.S. Ser. No. 10/910,857, entitled Polycarbonates and Photoconductive Imaging Members, the disclosure of which is totally incorporated herein by reference, a member comprised of a photogenerating layer and a charge transport layer, and wherein the charge transport layer is comprised of a charge transport component or components, and a crosslinked polycarbonate polymer of the formula

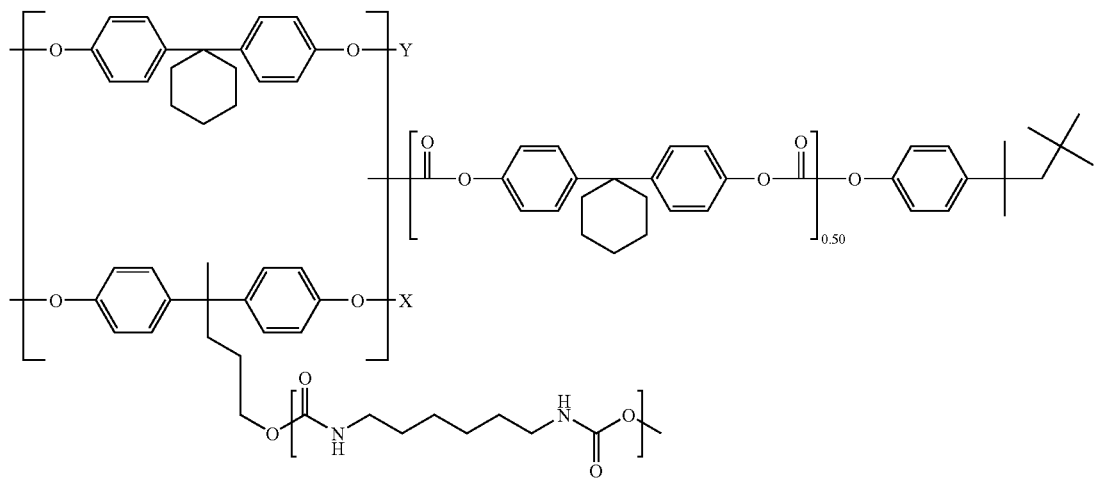

wherein X and Y represent the number of segments, and optionally wherein the sum of X and Y is equal to about 0.50.

There is illustrated in copending application U.S. Ser. No. 10/911,104, entitled Polycarbonates and Photoconductive Imaging Members, the disclosure of which is totally incorporated herein by reference, a composition comprised of a charge transport compound and a crosslinked polymer composition generated from the curing of a solution of a hydroxyl pendant polycarbonate, a hydroxylated charge transport compound, a curing agent and a solvent.

There is illustrated in copending application U.S. Ser. No. 10/369,816, entitled Photoconductive Imaging Members, the disclosure of which is totally incorporated herein by reference, a photoconductive imaging member comprised of a hole blocking layer, a photogenerating layer, and a charge transport layer, and wherein the hole blocking layer is comprised of a metal oxide; and a mixture of a phenolic compound and a phenolic resin wherein the phenolic compound contains at least two phenolic groups.

There is illustrated in copending application U.S. Ser. No. 10/370,186, entitled Photoconductive Imaging Members, the disclosure of which is totally incorporated herein by reference, a photoconductive imaging member comprised of a supporting substrate, a hole blocking layer thereover, a crosslinked photogenerating layer and a charge transport layer, and wherein the photogenerating layer is comprised of a photogenerating component and a vinyl chloride, allyl glycidyl ether, hydroxy containing polymer.

Illustrated in U.S. Pat. No. 6,444,386, the disclosure of which is totally incorporated herein by reference, is a photoconductive imaging member comprised of an optional supporting substrate, a hole blocking layer thereover, a photogenerating layer, and a charge transport layer, and wherein the hole blocking layer is generated from crosslinking an organosilane (I) in the presence of a hydroxyfunctionalized polymer (II)

wherein R is alkyl or aryl, $R^1$, $R^2$, and $R^3$ are independently selected from the group consisting of alkoxy, aryloxy, acyloxy, halide, cyano, and amino; A and B are respectively divalent and trivalent repeating units of polymer (II); D is a divalent linkage; x and y represent the mole fractions of the repeating units of A and B, respectively, and wherein x is from about 0 to about 0.99, and y is from about 0.01 to about 1, and wherein the sum of x+y is equal to about 1.

Illustrated in U.S. Pat. No. 6,287,737, the disclosure of which is totally incorporated herein by reference, is a photoconductive imaging member comprised of a supporting substrate, a hole blocking layer thereover, a photogenerating layer and a charge transport layer, and wherein the hole blocking layer is comprised of a crosslinked polymer generated, for example, from the reaction of a silyl-functionalized hydroxyalkyl polymer of Formula (I) with an organosilane of Formula (II) and water

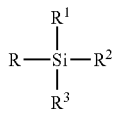

(II)

wherein, for example, A, B, D, and F represent the segments of the polymer backbone; E is an electron transporting moiety; Z is selected from the group consisting of chloride, bromide, iodide, cyano, alkoxy, acyloxy, and aryloxy; a, b, c, and d are mole fractions of the repeating monomer units such that the sum of a+b+c+d is equal to 1; R is alkyl, substituted alkyl, aryl, or substituted aryl with the substituent being halide, alkoxy, aryloxy, and amino; and $R^1$, $R^2$, and $R^3$ are independently selected from the group consisting of alkyl, aryl, alkoxy, aryloxy, acyloxy, halogen, cyano, and amino, subject to the provision that two of $R^1$, $R^2$, and $R^3$ are independently selected from the group consisting of alkoxy, aryloxy, acyloxy, and halide.

Illustrated in copending application U.S. Ser. No. 10/144,147, Publication No. 20030211413, now abandoned, the disclosure of which is totally incorporated herein by reference, is a photoconductive imaging member comprised of a supporting substrate, and thereover a single layer comprised of a mixture of a photogenerator component, a charge transport component, an electron transport component, and a polymer binder, and wherein the photogenerating component is a metal free phthalocyanine.

The appropriate components, such as photogenerating pigments, charge transport compounds, optional layers, and processes of the above copending applications may be selected for the present invention in embodiments thereof.

BACKGROUND

This invention is generally directed to imaging members, and more specifically, the present invention is directed to single and multi-layered photoconductive imaging members comprised of novel crosslinkable polymers, and which polymers may, for example, be selected for the charge transport layer of the imaging members. More specifically, the present invention relates to crosslinkable hydroxylated polycarbonates, processes thereof, and charge transporting layers thereof. In embodiments thereof, the present invention relates to hydroxyl pendant polycarbonates crosslinked with a functionalized charge transport compound and a curing agent, and charge transport compositions comprised of charge transport compounds/molecules, and a hydroxyl pendant polycarbonate crosslinked with a functionalized charge transport compound and a curing agent. Also, in embodiments the crosslinked charge transport components of a hydroxyl-pendant polycarbonate crosslinked with a functionalized, such as hydroxy, known charge transport, especially hole transport, and a known curing agent can be selected for the charge transport layer of a photoconductive imaging member as the top overcoat protective layer for a photoconductive imaging member, or as a component in the charge transport layer of a photoconductive imaging member. The crosslinked charge transport compositions can be prepared as illustrated herein, such as by reacting a hydroxylated charge transport compound with a curing agent, such as a diisocyanate, in the presence of a solvent to form an isocyanate charge transport coating composition, which can then be blended with a hydroxyl pendant polycarbonate. The resulting coating composition can then be deposited on a photogenerating layer of a photoconductive imaging member and/or the coating composition can be deposited on a charge transport layer, followed by curing in each instance.

Moreover, in embodiments of the present invention there is provided a charge transport (CT) composition comprised of charge transport molecules or compounds of, for example, aryl amines, a hydroxylated charge transport compound (CTM) or mixtures thereof, a hydroxyl pendant polycarbonate binder, and a curing agent which reacts with the CTM hydroxy group and polymer binder to form a prepolymer solution on reaction with a suitably functionalized difunctional compound such as a diisocyanate. The resulting composition can be applied or deposited as a charge transport layer in a photoconductive imaging member containing a photogenerating layer, and other known appropriate layers. On thermal curing at elevated temperatures a crosslinked polymeric network having excellent stability in all three dimensional directions is formed. The resulting crosslinked composition, such as, for example, crosslinked at from about 5 percent to about 75 percent, permits wear resistant and extended lifetimes for the photoconductive imaging member. Therefore, the charge transport layer may contain suitable percentages of charge, such as hole transport molecules, with the remainder being the crosslinked compositions illustrated herein, and wherein each of the free charge transport compounds and the functionalized CTM contribute to charge transport. Thus, the amount of free charge transport compounds selected can be reduced without or with only minimum adverse impacts on the electrical performance of the photoconductive imaging members.

Moreover, in embodiments thereof the present invention imaging members can contain a hole blocking, or undercoat layer (UCL) comprised of, for example, siloxane, such as tetraethoxysilane (TEOS) and 3-aminopropyl trimethoxysilane (γ-APS), a metal oxide, such as titanium oxide, dispersed in a phenolic resin/phenolic resin blend or a phenolic resin/phenolic compound blend, and further wherein this layer is modified by incorporating therein an in situ formed organic/inorganic network, and which network can, for example, enable thicker hole blocking layers and permit excellent, and in embodiments improved electron transporting characteristics by, for example, providing additional electron transporting paths, and which layer can be deposited on a supporting substrate. More specifically, the hole blocking layer usually in contact with the supporting substrate can be situated between the supporting substrate and the photogenerating layer, which is comprised, for example, of the photogenerating pigments of U.S. Pat. No. 5,482,811, the disclosure of which is totally incorporated herein by reference, especially Type V hydroxygallium phthalocyanine, and generally metal free phthalocyanines, metal phthalocyanines, perylenes, titanyl phthalocyanines, hydroxy gallium phthalocyanines, selenium, selenium alloys, and the like.

The imaging members of the present invention in embodiments exhibit excellent cyclic/environmental stability, and substantially no adverse changes in their performance over extended time periods; resistance to wear and excellent imaging member lifetimes exceeding, for example, 1,000,000 imaging cycles; excellent and improved electrical characteristics; low and excellent $V_{low}$, that is the surface potential of the imaging member subsequent to a certain light exposure, and which $V_{low}$ is, for example, about 20 to about 100 volts lower than, for example, related imaging members free of the crosslinkable polycarbonate illustrated herein.

The photoresponsive, or photoconductive imaging members can be negatively charged when the photogenerating layers are situated between the hole transport layer and the hole blocking layer deposited on the substrate.

Processes of imaging, especially xerographic imaging and printing, including digital, are also encompassed by the present invention. More specifically, the layered photoconductive imaging members of the present invention can be selected for a number of different known imaging and printing processes including, for example, electrophotographic imaging processes, especially xerographic imaging and printing processes wherein charged latent images are rendered visible with toner compositions of an appropriate charge polarity. The imaging members are in embodiments sensitive in the wavelength region of, for example, from about 500 to about 900 nanometers, and in particular from about 650 to about 850 nanometers, thus diode lasers can be selected as the light source. Moreover, the imaging members of this invention are useful in color xerographic applications, particularly high-speed color copying and printing processes.

REFERENCES

Illustrated in U.S. Pat. No. 6,015,645, the disclosure of which is totally incorporated herein by reference, is a photoconductive imaging member comprised of a supporting substrate, a hole blocking layer, an optional adhesive layer, a photogenerator layer, and a charge transport layer, and wherein the blocking layer is comprised, for example, of a polyhaloalkylstyrene.

Illustrated in U.S. Pat. No. 5,473,064, the disclosure of which is totally incorporated herein by reference, is a process for the preparation of hydroxygallium phthalocyanine Type V, essentially free of chlorine, whereby, for example, a pigment precursor Type I chloro gallium phthalocyanine is prepared by the reaction of gallium chloride in a solvent, such as N-methylpyrrolidone, present in an amount of from about 10 parts to about 100 parts, and preferably about 19 parts with 1,3-diiminoisoindolene ($DI^3$) in an amount of from about 1 part to about 10 parts, and preferably about 4 parts $DI^3$, for each part of gallium chloride that is reacted; hydrolyzing the pigment precursor chlorogallium phthalocyanine Type I by standard methods, for example acid pasting, whereby the pigment precursor is dissolved in concentrated sulfuric acid and then reprecipitated in a solvent, such as water, or a dilute ammonia solution, for example from about 10 to about 15 percent; and subsequently treating the resulting hydrolyzed pigment hydroxygallium phthalocyanine Type I with a solvent, such as N,N-dimethylformamide, present in an amount of from about 1 volume part to about 50 volume parts, and preferably about 15 volume parts for each weight part of pigment hydroxygallium phthalocyanine that is used by, for example, ballmilling the Type I hydroxygallium phthalocyanine pigment in the presence of spherical glass beads, approximately 1 millimeter to 5 millimeters in diameter, at room temperature, about 25° C., for a period of from about 12 hours to about 1 week, and preferably about 24 hours.

Illustrated in U.S. Pat. No. 5,521,043, the disclosure of which is totally incorporated herein by reference, are photoconductive imaging members comprised of a supporting substrate, a photogenerating layer of hydroxygallium phthalocyanine, a charge transport layer, a photogenerating layer of BZP perylene, which is preferably a mixture of bisbenzimidazo(2,1-a-1',2'-b)anthra(2,1,9-def:6,5,10-d'e'f')diisoquinoline-6,11-dione and bisbenzimidazo(2,1-a:2',1'-a)anthra(2,1,9-def:6,5,10-d'e'f')diisoquinoline-10,21-dione, reference U.S. Pat. No. 4,587,189, the disclosure of which is totally incorporated herein by reference; and as a top layer a second charge transport layer.

The appropriate components and processes of the above patents may be selected for the present invention in embodiments thereof.

Layered photoresponsive imaging members have been described in numerous U.S. patents, such as U.S. Pat. No. 4,265,990, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006, the disclosure of which is totally incorporated herein by reference, a composite xerographic photoconductive member comprised of finely divided particles of a photoconductive inorganic compound dispersed in an electrically insulating organic resin binder.

In U.S. Pat. No. 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with, for example, a perylene, pigment photogenerating component. Both of the aforementioned patents disclose an aryl amine component, such as N,N'-diphenyl-N,N'-bis(3-methyl phenyl)-1,1'-biphenyl-4,4'-diamine dispersed in a polycarbonate binder as a hole transport layer. The above components, such as the photogenerating compounds and the aryl amine charge transport, can be selected for the imaging members of the present invention in embodiments thereof.

In U.S. Pat. No. 4,921,769, the disclosure of which is totally incorporated herein by reference, there are illustrated photoconductive imaging members with blocking layers of certain polyurethanes.

Illustrated in U.S. Pat. Nos. 6,255,027; 6,177,219, and 6,156,468, the disclosures of which are totally incorporated herein by reference, are, for example, photoreceptors containing a hole blocking layer of a plurality of light scattering particles dispersed in a binder, reference for example, Example I of U.S. Pat. No. 6,156,468, the disclosure of which is totally incorporated herein by reference, wherein there is illustrated a hole blocking layer of titanium dioxide dispersed in a specific linear phenolic binder of VARCUM™, available from OxyChem Company.

SUMMARY

It is a feature of the present invention to provide new polycarbonates, crosslinked polycarbonates, and imaging members thereof with many of the advantages illustrated herein, such as excellent mechanical wear resistance characteristics, acceptable and improved resistance to electrical degradation, excellent photoinduced discharge characteristics, cyclic and environmental stability, and acceptable charge deficient spot levels arising from dark injection of charge carriers.

Another feature of the present invention relates to the provision of layered photoresponsive imaging members, which are responsive to near infrared radiation of from about 700 to about 900 nanometers.

It is yet another feature of the present invention to provide layered photoresponsive imaging members with sensitivity to visible light.

Aspects of the present invention relate to a member comprised of a photogenerating layer and a charge transport layer, and wherein the charge transport layer is comprised of a charge transport component or components, and a crosslinked polycarbonate polymer of the formula

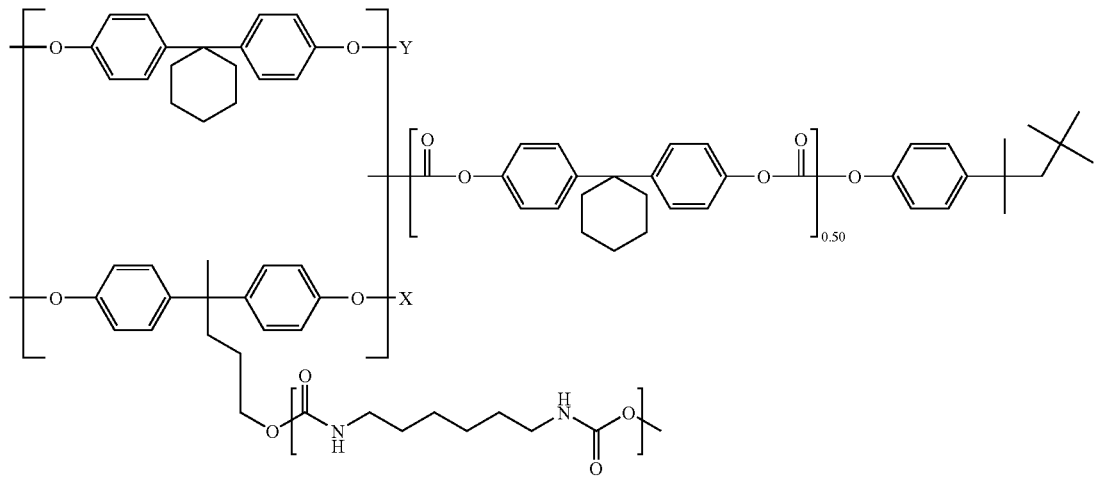

wherein X and Y represent the number of segments, and optionally wherein the sum of X and Y is equal to about 0.50; a photoconductive imaging member comprised of a photogenerating layer and a charge transport layer, and wherein the charge transport layer is generated from a coating solution of a hydroxyl pendant polycarbonate, a hydroxylated charge transport compound, a curing agent and a solvent, and which solution is applied to the photogenerating layer, and thereafter heating to enable a crosslinked polymer of the formula

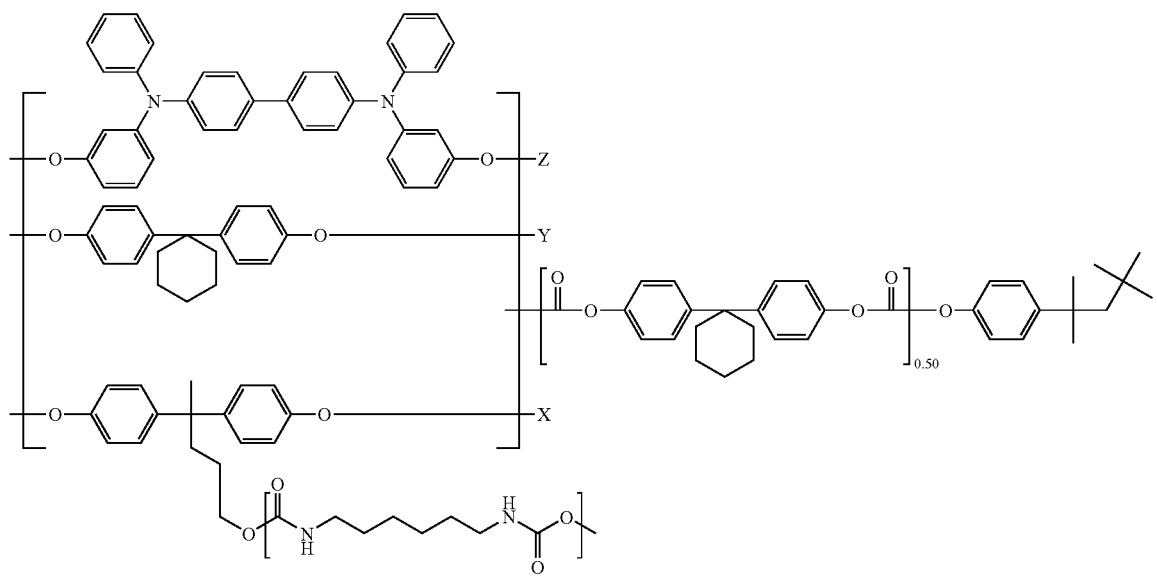

and optionally wherein the sum of X plus Y plus Z is equal to about 0.50; a photoconductor as illustrated herein, and wherein the hydroxy pendant polycarbonate is of the formulas

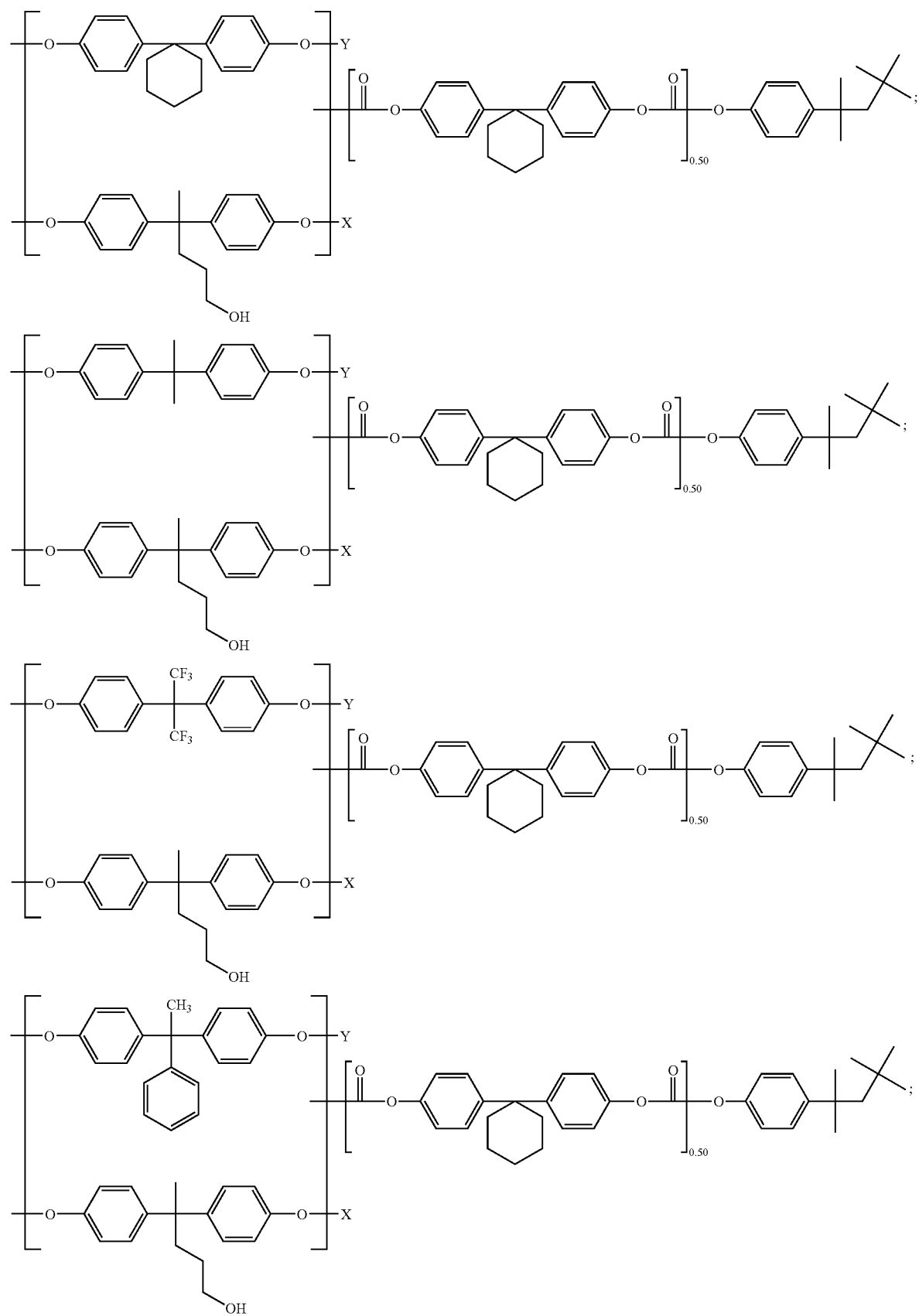

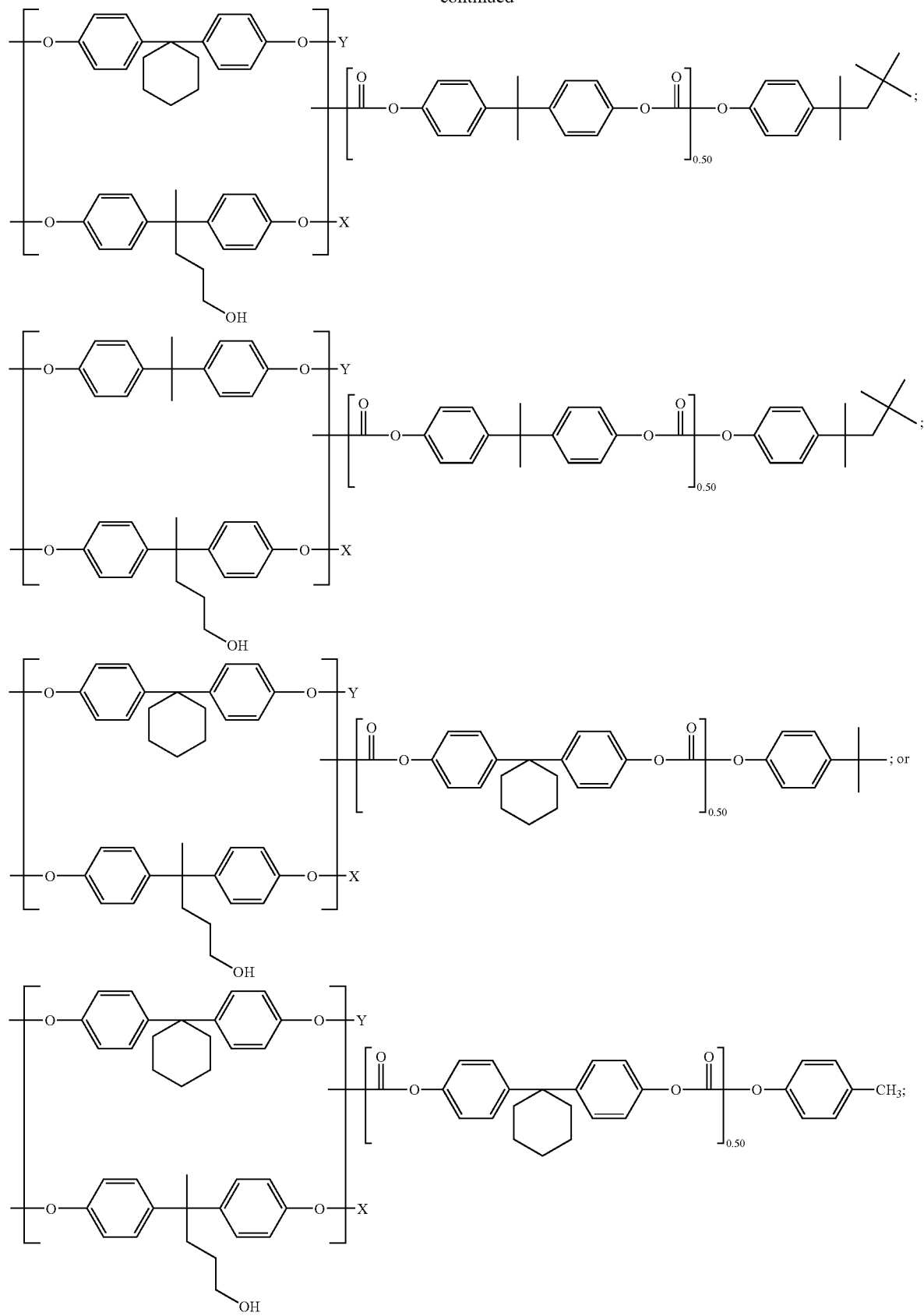

a photoconductor as illustrated herein, and wherein the hydroxylated charge transport compound is of the formulas

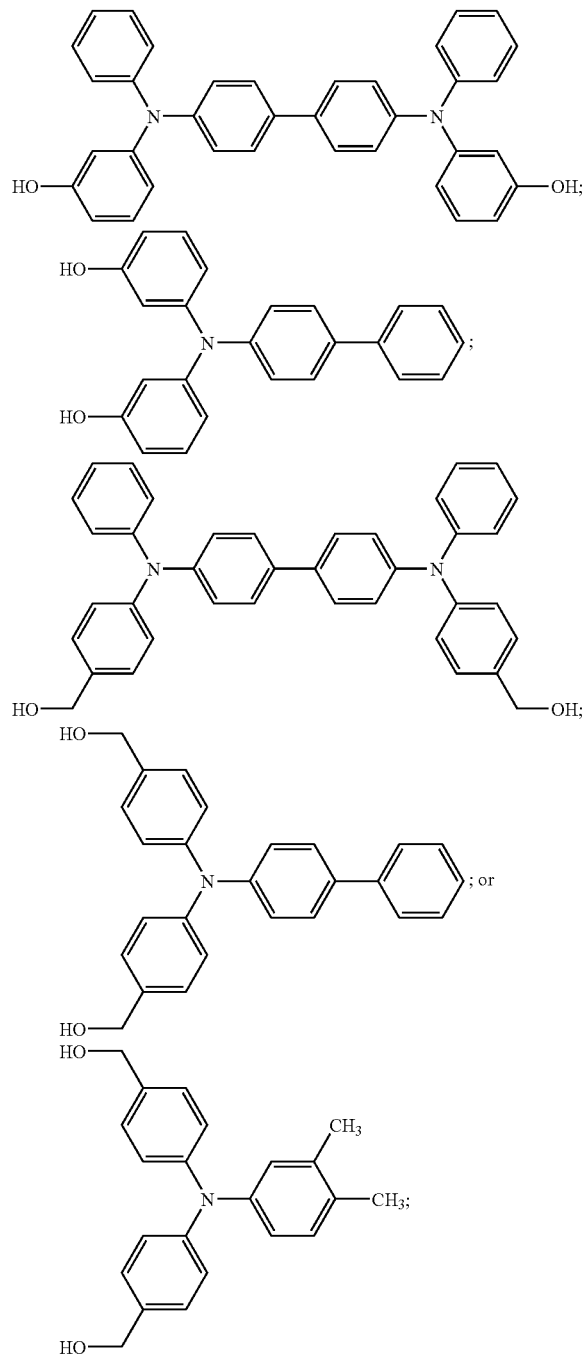

a photoconductor as illustrated herein and wherein the curing agent is

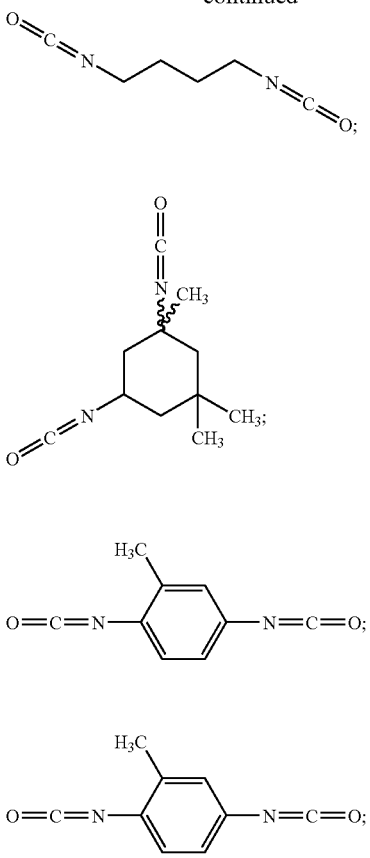

a photoconductive imaging member comprised of a supporting substrate, a photogenerating layer, and a charge transport layer, and wherein the charge transport layer is generated from a coating solution comprised of a hydroxyl pendant polycarbonate, a hydroxylated charge transport compound, a charge transporting compound, a curing agent and a solvent, and which solution is applied to the photogenerating layer, and thereafter heating to enable a crosslinked charge transport composition comprised of a crosslinked polycarbonate binder material formed by the reaction of a hydroxylated polycarbonate and a hydroxylated charge transporting compound with a polyfunctional isocyanate where the hydroxylated polycarbonate is present in a concentration of about 25 to about 75 percent by weight, wherein the hydroxylated charge transporting compound is present in a concentration of about 10 to about 50 percent by weight, and wherein the charge transporting compound is present in a concentration or amount of about 10 to about 50 percent by weight, and wherein the polyfunctional isocyanate is present as an equivalent of isocyanate per equivalent of hydroxyl group in moles or about 0.25 to about 1; a composition comprised of a charge transport compound and a crosslinked polymer composition generated from the curing of a solution of a hydroxyl pendant polycarbonate, a hydroxylated charge transport compound, a curing agent and a solvent; a composition comprised of charge transport molecules and a crosslinked polymer of the formula generated from a hydroxyl pendant polycarbonate, a hydroxylated charge transport compound, and a curing agent

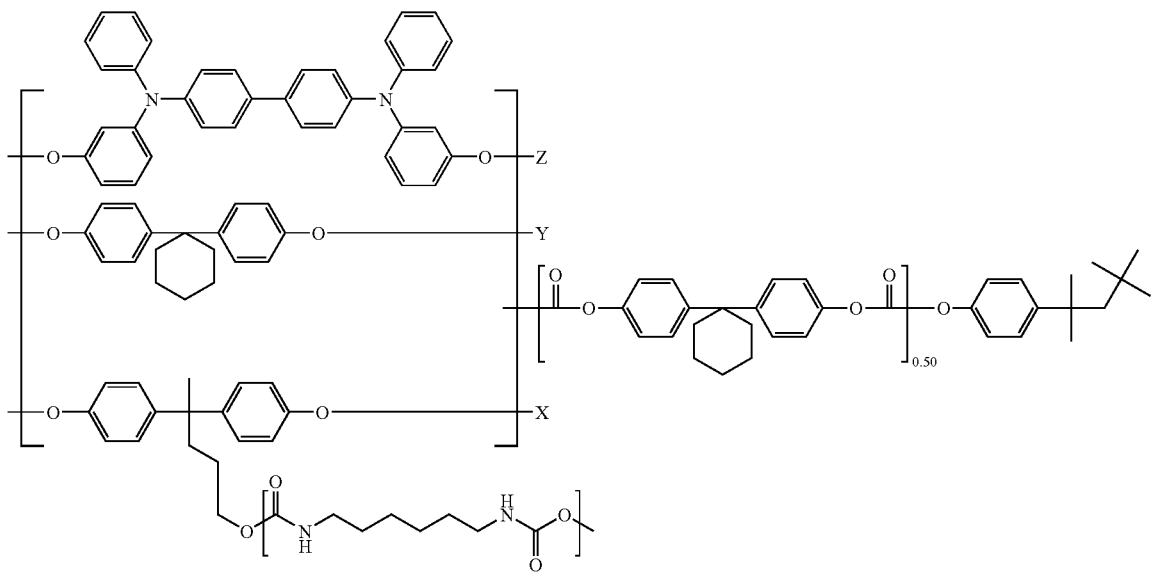

wherein the sum of X plus Y plus Z is equal to 0.50; a composition comprised of

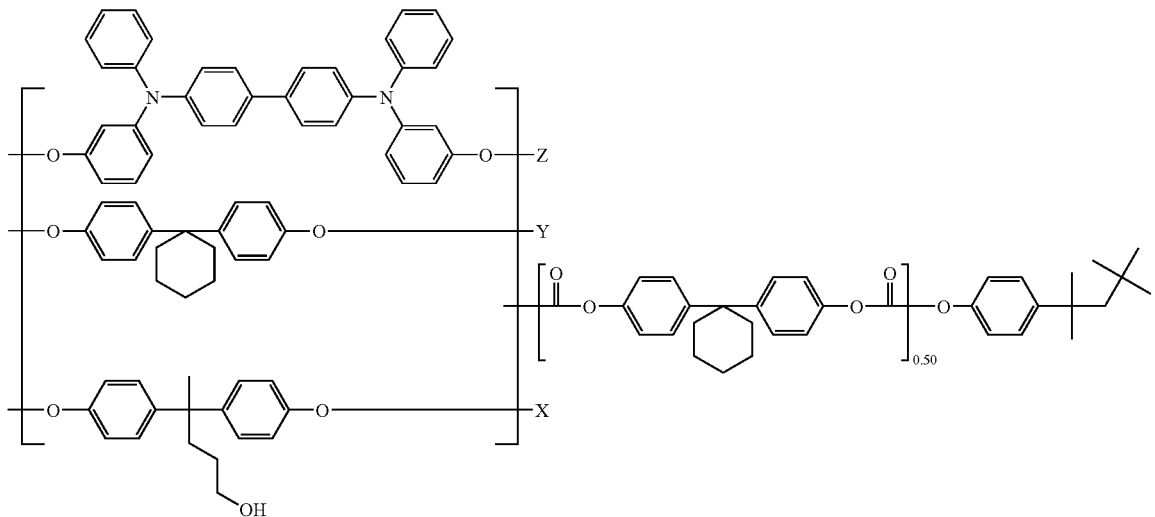

from about 50 to about 55 percent by weight; a hydroxylated charge transport compound

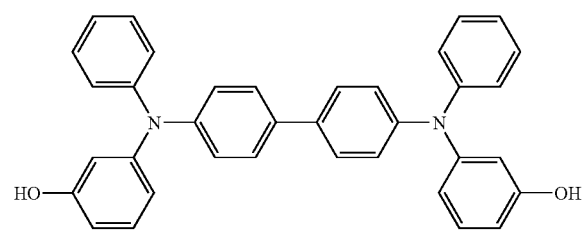

from about 20 to about 25 percent by weight; a curing agent from about 0.75 to about 1 percent by weight; and a solvent mixture; a polycarbonate generated from the polymerization of a hydroxylated monomer, a hydroxylated charge transport compound, a bisphenol, a curing compound, and a bisphenol haloformate, and thereafter subjecting the obtained polymer to a reaction with an acidic compound; a polycarbonate generated from bisphenol Z and bisphenol Z bischloroformate, and a monophenolic endcapping agent optionally comprised of 4-t-octylphenol, 4-t-butylphenol or 4-methylphenol, and a charge transporting compound of the formula

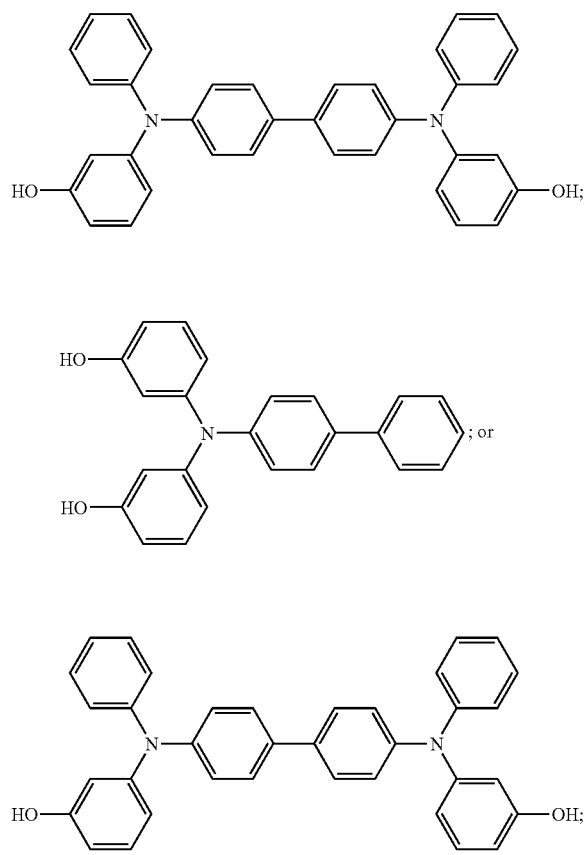

a polycarbonate of the formula

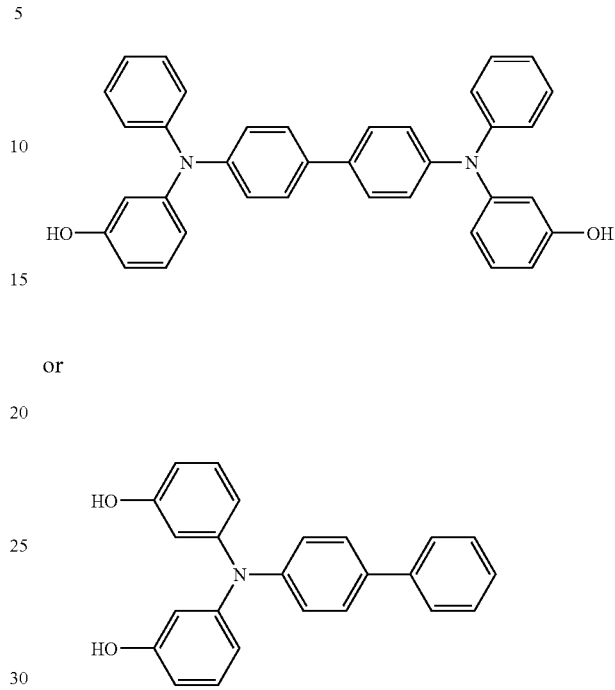

bisphenol E or mixtures thereof, and a monophenolic compound of 4-t-octylphenol, 4-t-butylphenol or 4-methylphenol, a protected hydroxylated phenolic monomer and a hydroxylated charge transporting compound of or and a bishaloformate compound of bisphenol A-bischloroformate and bisphenol Z-bischloroformate in the presence of an organic solvent of dichloromethane, chlorobenzene, or toluene, and an inorganic base dissolved in water, and wherein the base is sodium hydroxide, potassium hydroxide,

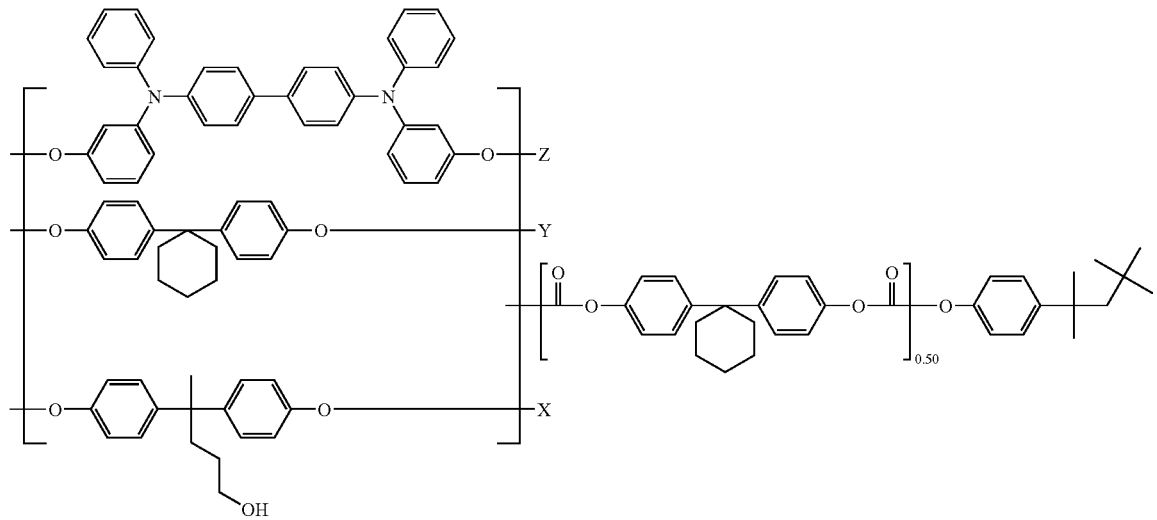

and optionally wherein the sum of X plus Y plus Z is equal to about 0.5; a polycarbonate prepared by interfacial polymerization, and where the interfacial polymerization is accomplished during the mixing of a phenolic compound of bisphenol A, bisphenol Z, bisphenol C, bisphenol AP, rhodium hydroxide or cesium hydroxide and a phase transfer catalyst optionally comprised of triethylbenzylammonium chloride; a crosslinked polycarbonate generated by the interfacial polymerization in dichloromethane of a protected hydroxylated bisphenolic compound of the formula a bisphenolic compound of the formula

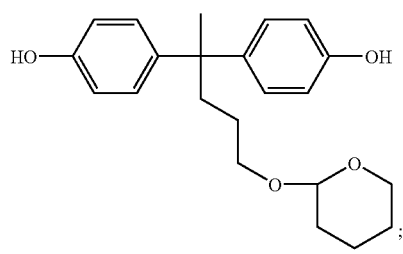

;

a monophenolic compound of the formula

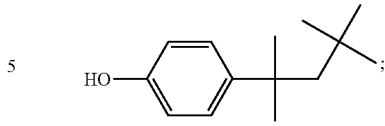

;

and a bishaloformate compound of the formula

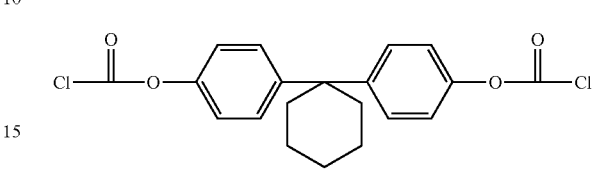

in the presence of an aqueous solution of potassium hydroxide and a catalytic amount of triethylbenzylammonium chloride; subsequently reacting with methanol and pyridium-p-tosylate, and subsequently crosslinking the resulting product with 1,6-diisocyanatohexane; the polycarbonates of the formulas

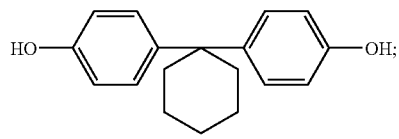

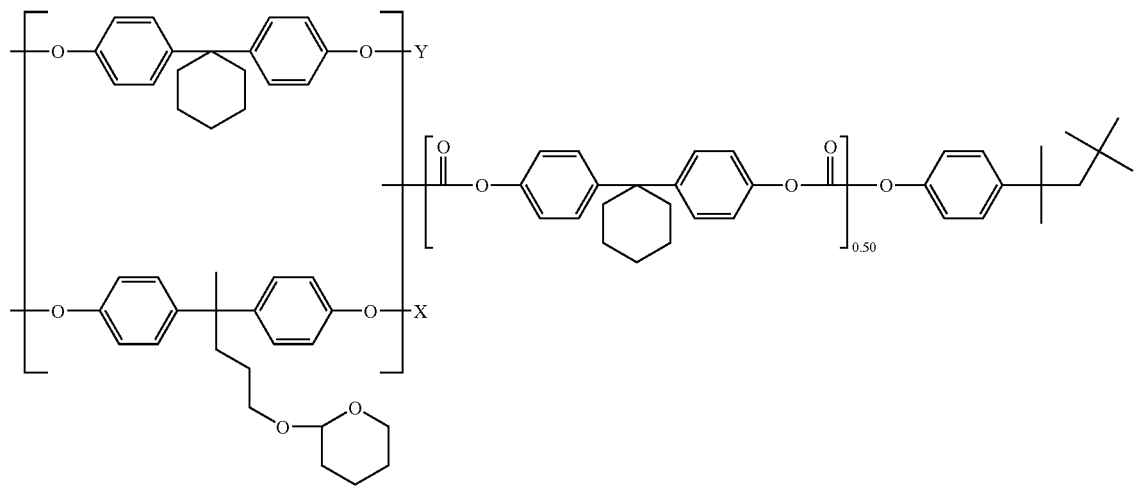

wherein X=0.1 and Y=0.4; or

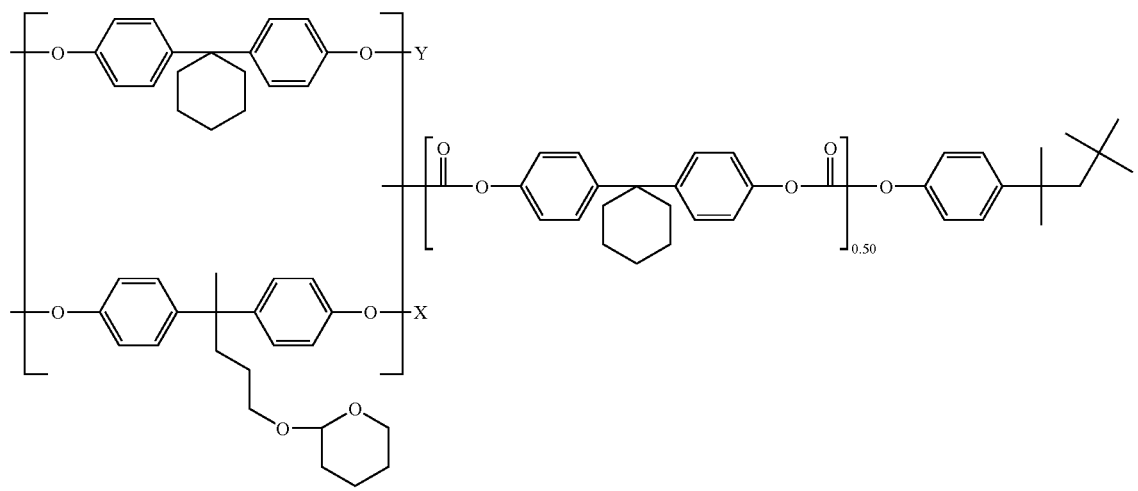

wherein X=0.1 and Y=0.4; a composition and photoconductor thereof comprised of a mixture of monomers where at least one monomer is a charge transporting monomer, and optionally a hydroxylated charge transporting compound and a di or polyfunctional isocyanate material wherein the hydroxylated polycarbonate material is present in a concentration of from about 25 to about 75 percent by weight; wherein the optional hydroxylated charge transporting compound is present in a concentration of from about 10 to about 50 percent by weight, and wherein the charge transporting compound is present in a concentration of from about 10 to about 50 percent by weight, wherein the amount of di or polyfunctional isocyanate material can be expressed as an equivalent of isocyanate per equivalent of hydroxyl group in moles of from about 0.25 to about 1, about 0.5 to about 1, or about 0.75 to about 1; a photoconductive imaging member comprised of a supporting substrate, a hole blocking layer thereover, a photogenerating layer and a charge transport layer, and wherein the charge transport layer is comprised of the crosslinked polycarbonates illustrated herein, or wherein the charge transport layer is comprised of a charge transport compound, and the reaction product of a charge transport and the new polycarbonates illustrated herein; a photoconductive imaging member comprised in sequence of a supporting substrate, a hole blocking layer, a photogenerating layer and a charge transport layer; a photoconductive imaging member wherein the supporting substrate is comprised of a conductive metal substrate; a photoconductive imaging member wherein the conductive substrate is aluminum, aluminized polyethylene terephthalate or titanized polyethylene; a photoconductive imaging member wherein the photogenerator layer is of a thickness of from about 0.05 to about 10 microns; a photoconductive imaging member wherein the charge, such as hole transport layer, is of a thickness of from about 10 to about 50 microns; a photoconductive imaging member wherein the photogenerating layer is comprised of photogenerating pigments dispersed in a resinous binder in an amount of from about 5 percent by weight to about 95 percent by weight; a photoconductive imaging member wherein the photogenerating resinous binder is selected from the group consisting of copolymers of vinyl chloride, vinyl acetate and hydroxy and/or acid containing monomers, polyesters, polyvinyl butyrals, polycarbonates, polystyrene-b-polyvinyl pyridine, and polyvinyl formals; a photoconductive imaging member wherein the charge transport layer comprises an aryl amine molecule or molecules and/or a functionalized aryl amine molecule; wherein the aryl amines are, for example, of the formula

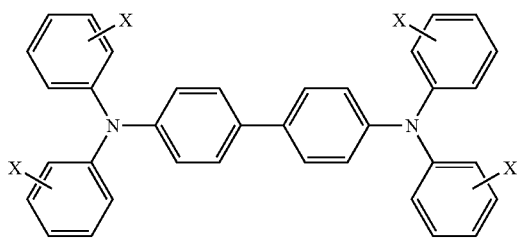

wherein X is selected, with respect to the unfunctionalized aryl amine, from the group consisting of alkyl, aryl and halogen, and wherein alkyl includes saturated, unsaturated, linear, branched, cyclic, unsubstituted, and substituted alkyl groups, and wherein heteroatoms, such as oxygen, nitrogen, sulfur, silicon, phosphorus, and the like, can be present in the alkyl group, and which alkyl typically contains from 1 to about 30 carbon atoms, and more specifically, from 1 to about 6 carbon atoms, and yet more specifically, 1 carbon atom; wherein aryl includes unsubstituted and substituted aryl groups, and wherein heteroatoms, such as oxygen, sulfur, nitrogen, silicon, phosphorus, or the like, can be present, and which aryl typically contains from 6 to about 30 carbon atoms, more specifically, from 6 to about 12 carbon atoms, and yet more specifically, 6 carbon atoms; wherein arylalkyl includes unsubstituted and substituted arylalkyl groups, and wherein heteroatoms, such as oxygen, nitrogen, sulfur, silicon, phosphorus, and the like, can be present in either or both of the alkyl portion and the aryl portion of the arylalkyl group, and which arylalkyl typically contains from 7 to about 35 carbon atoms, more specifically from 7 to about 15 carbon atoms, and yet more specifically, 7 carbon atoms, and benzyl; wherein alkylaryl groups include unsubstituted and substituted alkylaryl groups, and wherein heteroatoms, such as oxygen, nitrogen, sulfur, silicon, phosphorus, and the like, may be present in either or both of the alkyl portion and the aryl portion of the alkylaryl group, and which alkylaryl typically contains from 7 to about 35 carbon atoms, and more specifically, from 7 to about 15 carbon atoms, and tolyl; alkyl wherein the alkyl group includes saturated, unsaturated, linear, branched, cyclic, unsubstituted, and substituted alkyl groups, and wherein heteroatoms, such as oxygen, nitrogen, sulfur, silicon, phosphorus, and the like, may be present in the alkyl group, and which alkyl typically contains from 1 to about 30 carbon atoms, and more specifically, with from 1 to about 6 carbon atoms, and wherein the alkyl group optionally contains a functional group suitable for reaction with an isocyanate compound and the like curing or crosslinking agents, and which functional group is, for example, hydroxyl or amino; aryl groups of unsubstituted and substituted aryl groups, and wherein heteroatoms, such as oxygen, sulfur, nitrogen, silicon, phosphorus, or the like, may be present in the aryl group, which aryl typically contains from 6 to about 30 carbon atoms, preferably with from 6 to about 12 carbon atoms, and more specifically, 6 carbon atoms, although the number of carbon atoms can be outside of this range, and wherein the aryl group contains a functional group suitable for reaction with an isocyanate compound, and which functional group is, for example, hydroxyl or amino; arylalkyl groups include unsubstituted and substituted arylalkyl groups, and wherein heteroatoms, such as oxygen, nitrogen, sulfur, silicon, phosphorus, or mixtures thereof, may be present in either or both of the alkyl portion and the aryl portion of the arylalkyl group, which groups typically contain from 7 to about 35 carbon atoms, preferably with from 7 to about 15 carbon atoms, and more preferably 7 carbon atoms, although the number of carbon atoms can be outside of this range, such as benzyl or the like; alkylaryl groups include unsubstituted and substituted alkylaryl groups, and wherein heteroatoms, such as oxygen, nitrogen, sulfur, silicon, phosphorus, and the like, may be present in either or both of the alkyl portion and the aryl portion of the alkylaryl group, which group typically contains from 7 to about 35 carbon atoms, and more preferably with from 7 to about 15 carbon atoms, wherein the alkylaryl group contains a functional group suitable for reaction with an isocyanate compound or the like, which functional group can be hydroxyl or amino; or an aryl amine molecule and/or a functionalized aryl amine molecule; wherein the aryl amines are of the formula

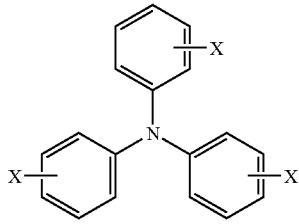

wherein X is selected from the group consisting of alkyl and halogen, wherein alkyl includes saturated, unsaturated, linear, branched, cyclic, unsubstituted, and substituted alkyl groups, and wherein heteroatoms, such as oxygen, nitrogen, sulfur, silicon, phosphorus, and the like, may be present in the alkyl group, which alkyl typically contains from 1 to about 30 carbon atoms, and more specifically, from 1 to about 6 carbon atoms, and yet more specifically 1 carbon atom; aryl groups include unsubstituted and substituted aryl groups, and wherein heteroatoms, such as oxygen, sulfur, nitrogen, silicon, phosphorus, or the like, may be present in the aryl group, which groups typically contain from 6 to about 30 carbon atoms, more specifically, from 6 to about 12 carbon atoms, and yet more specifically, 6 carbon atoms; arylalkyl unsubstituted and substituted arylalkyl groups, and wherein heteroatoms, such as oxygen, nitrogen, sulfur, silicon, phosphorus, and the like, may be present in either or both of the alkyl portion and the aryl portion of the arylalkyl group, which groups typically contain from 7 to about 35 carbon atoms, more specifically, from 7 to about 15 carbon atoms, and yet more specifically, 7 carbon atoms; alkylaryl groups include unsubstituted and substituted alkylaryl groups, and wherein heteroatoms, such as oxygen, nitrogen, sulfur, silicon, phosphorus, and the like, may be present in either or both of the alkyl portion and the aryl portion of the alkylaryl group, which groups typically contain from 7 to about 35 carbon atoms; wherein X is a functionalized entity of a component containing a hydroxyl, an amino, a thiol, alkyl wherein the alkyl group includes saturated, unsaturated, linear, branched, cyclic, unsubstituted, and substituted alkyl groups, and wherein heteroatoms, such as oxygen, nitrogen, sulfur, silicon, phosphorus, and the like, may be present in the alkyl group, which groups typically contain from 1 to about 30 carbon atoms, and more specifically, from 1 to about 6 carbon atoms, and yet more specifically, 1 carbon atom; wherein the alkyl group contains a functional group suitable for reaction with an isocyanate compound or the like, such as hydroxyl or amino. Embodiments of the present invention relate to polycarbonates and imaging members thereof, and wherein the hole transport aryl amine is dispersed in a hydroxylated polycarbonate or polycarbonate containing hydroxyl groups pendent to the main chain of the polymer; a photoconductive imaging member wherein the photogenerating layer is comprised of metal phthalocyanines, or metal free phthalocyanines; a photoconductive imaging member wherein the photogenerating layer is comprised of titanyl phthalocyanines, perylenes, alkylhydroxygallium phthalocyanines, hydroxygallium phthalocyanines, or mixtures thereof; a photoconductive imaging member wherein the photogenerating layer is comprised of Type V hydroxygallium phthalocyanine; a method of imaging which comprises generating an electrostatic latent image on the imaging member illustrated herein, developing the latent image, and transferring the developed electrostatic image to a suitable substrate; a method of printing an imaging member wherein the phenolic compound of the hole blocking layer is bisphenol S, 4,4'-sulfonyldiphenol; an imaging member wherein the phenolic compound is bisphenol A, 4,4'-isopropylidenediphenol; an imaging member wherein the phenolic compound is bisphenol E, 4,4'-ethylidenebisphenol; an imaging member wherein the phenolic compound is bisphenol F, bis(4-hydroxyphenyl)methane; an imaging member wherein the phenolic compound is bisphenol M, 4,4'-(1,3-phenylenediisopropylidene) bisphenol; an imaging member wherein the phenolic compound is bisphenol P, 4,4'-(1,4-phenylenediisopropylidene) bisphenol; an imaging member wherein the phenolic compound is bisphenol Z, 4,4'-cyclohexylidenebisphenol; an imaging member wherein the phenolic compound is hexafluorobisphenol A, 4,4'-(hexafluoroisopropylidene) diphenol; an imaging member wherein the phenolic compound is resorcinol, 1,3-benzenediol; an imaging member wherein the phenolic compound is hydroxyquinone, 1,4-benzenediol; an imaging member wherein the phenolic compound is of the formula

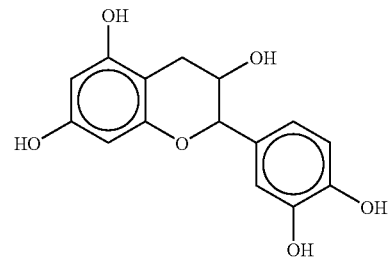

Catechin an imaging member wherein the phenolic resin of the hole blocking layer is selected from the group consisting of a formaldehyde polymer generated with phenol, p-tert-butylphenol and cresol; a formaldehyde polymer generated with ammonia, cresol and phenol; a formaldehyde polymer generated with 4,4'-(1-methylethylidene) bisphenol; a formaldehyde polymer generated with cresol and phenol; and a formaldehyde polymer generated with phenol and p-tert-butylphenol; and an imaging member wherein there is selected for the in situ formed inorganic/organic network of the hole blocking layer from about 5 to about 50 weight percent of the inorganic component, such as silica, titania, zirconia, and from about 50 to about 95 weight percent of the organic component.

In embodiments of the present invention the polycarbonate can be generated by the reaction and polymerization of a monomer containing a chemically masked hydroxyl group and prepared in accordance with the following reaction scheme

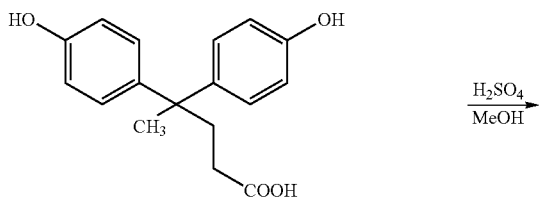
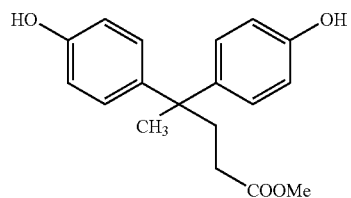

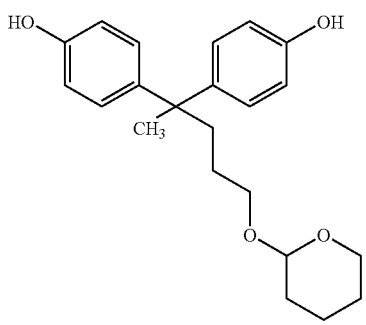
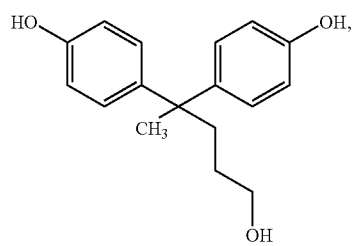

a bisphenol, such as bisphenol Z (1,1-(4-hydroxylphenyl)cyclohexane)

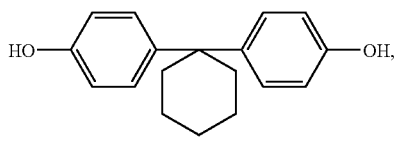

an endcapping agent like (4-t-ocylphenol)

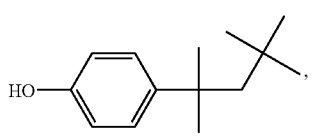

and a bischloroformate compound (1,1-(4-chloroformylphenyl)cyclohexane)

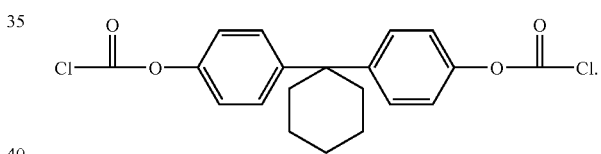

The resulting polymers possess molecular weights which depend primarily on the amount of endcapping agent used. Thereafter, the resulting chemically masked hydroxyl group can be chemically converted to a hydroxyl group by reaction with a catalytic amount of a known or future developed weakly acidic compound of, for example, a pyridium-p-tosylate.

In another embodiment of the present invention polycarbonates can be generated by the reaction and polymerization of a monomer containing a chemically masked hydroxyl group prepared in accordance with the following reaction scheme

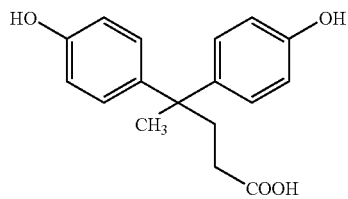
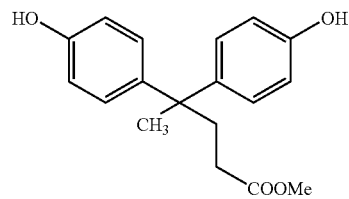

-continued

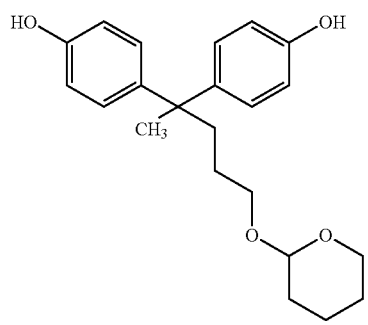  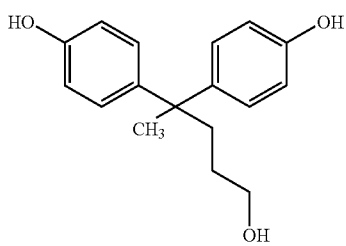

N,N'-(3-hydroxyphenyl)-N,N'-(phenyl)-benzidene

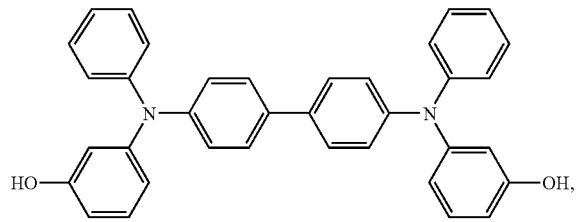

a bisphenol, such as bisphenol Z (1,1-(4-hydroxylphenyl)cyclohexane)

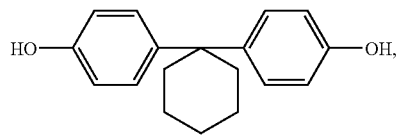

an endcapping agent like (4-t-ocylphenol)

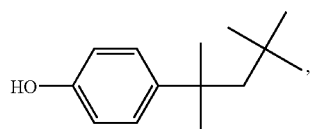

and a bischloroformate compound (1,1-(4-chloroformylphenyl)cyclohexane)

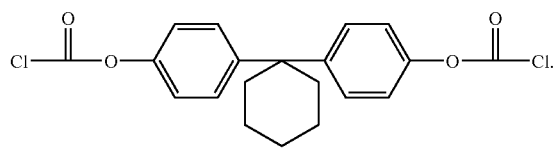

Thereafter, the chemically masked hydroxyl group can be chemically converted to a hydroxyl group by reaction with a catalytic amount of a weakly acidic compound of, for example, pyridium-p-tosylate.

Examples of components for the photoconductive member charge transport layer include components generated from (1) a chemically inert charge transport molecules such as

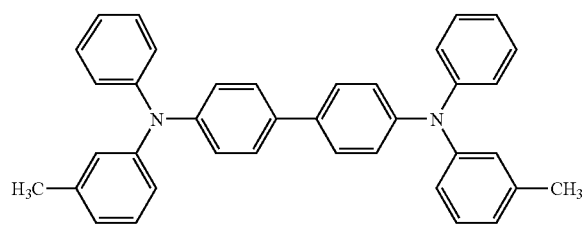

and/or

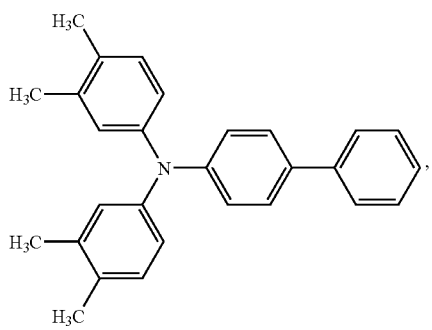

a hydroxylated charge transport compound of, for example,

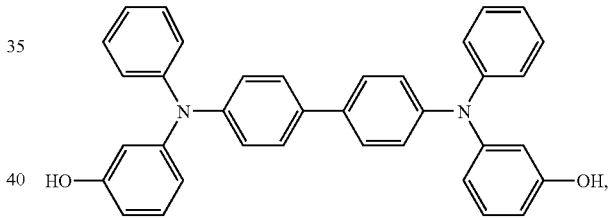

a hydroxy pendant polycarbonate binder and a curing agent like a diisocyanate, such as 1,6-hexamethylene diisocyanate, and (2) a hydroxy-pendant polycarbonate crosslinked with a functionalized charge transport compound, such as

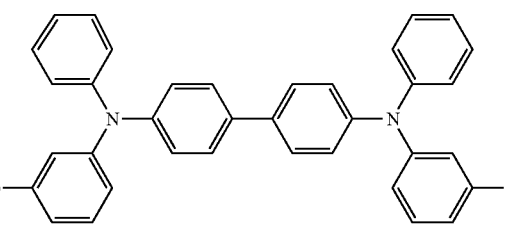

and a curing compound. The resulting crosslinked compositions of (1) can be selected as a charge transport layer, and/or as a protective overcoating layer for the photoconductive imaging members illustrated herein and similar imaging members, and which compositions can improve and minimize the mechanical wearability characteristics of the members and thereby extend their useful life. Crosslinked polymers of (1) are generated, for example, by applying a solution of the hydroxy pendant polycarbonate, a hydroxylated hole transport compound, such as

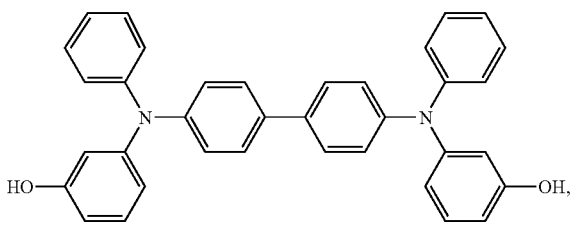

a solvent, such as tetrahydrofuran, toluene or monochlorobenzene and the like, or mixtures thereof, and a diisocyanate curing agent, such as 1,6-hexamethylene diisocyanate or 2,4-toluenediisocyanate, followed by heating at, for example, from about 125° C. to about 150° C., and more specifically, about 135° C., which heating enables the curing agent, such as the diisocyanate, to react with the hydroxyl group of the hole transport and the hydroxy-pendant polycarbonate to form a crosslinked matrix. Also, a polymeric polycarbonate binder containing pendent hydroxyl groups and an arylamine compound within the backbone can be used in place of the polymeric polycarbonate binder containing pendent hydroxyl groups.

Illustrative examples of substrate layers selected for the imaging members of the present invention, and which substrates can be opaque or substantially transparent, comprise a layer of insulating material including inorganic or organic polymeric materials, such as MYLAR® a commercially available polymer, MYLAR® containing titanium, a layer of an organic or inorganic material having a semiconductive surface layer, such as indium tin oxide, or aluminum arranged thereon, or a conductive material inclusive of aluminum, chromium, nickel, brass or the like. The substrate may be flexible, seamless, or rigid, and may have a number of many different configurations, such as for example, a plate, a cylindrical drum, a scroll, an endless flexible belt, and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON®.

The thickness of the substrate layer depends on many factors, including economical considerations, thus this layer may be of substantial thickness, for example over 3,000 microns, or of minimum thickness providing there are no significant adverse effects on the member. In embodiments, the thickness of this layer is from about 75 microns to about 300 microns.

The photogenerating layer, which can, for example, be comprised of a number of known components, such as metal phthalocyanines, metal free phthalocyanines, perylenes, gallium phthalocyanines, such as hydroxygallium phthalocyanine Type V, is in embodiments comprised of, for example, about 60 weight percent of the photogenerating component and about 40 weight percent of a resin binder like polyvinylchloride vinylacetate copolymer such as VMCH (Dow Chemical). The photogenerating layer can contain known photogenerating pigments, such as metal phthalocyanines, metal free phthalocyanines, alkylhydroxyl gallium phthalocyanine, hydroxygallium phthalocyanines, perylenes, especially bis(benzimidazo)perylene, titanyl phthalocyanines, and the like, and more specifically, vanadyl phthalocyanines, Type V hydroxygallium phthalocyanines, and inorganic components such as selenium, selenium alloys, and trigonal selenium. The photogenerating pigment can be dispersed in a resin binder similar to the resin binders selected for the charge transport layer, or alternatively no resin binder is present. Generally, the thickness of the photogenerator layer depends on a number of factors, including the thicknesses of the other layers and the amount of photogenerator material contained in the photogenerating layers. Accordingly, this layer can be of a thickness of, for example, from about 0.05 micron to about 10 microns, and more specifically, from about 0.25 micron to about 2 microns when, for example, the photogenerator compositions are present in an amount of from about 30 to about 75 percent by volume. The maximum thickness of this layer in embodiments is dependent primarily upon factors, such as photosensitivity, electrical properties and mechanical considerations. The photogenerating layer binder resin present in various suitable amounts, for example from about 1 to about 50, and more specifically, from about 1 to about 10 weight percent, may be selected from a number of known polymers, such as poly(vinyl butyral), poly(vinyl carbazole), polyesters, polycarbonates, poly(vinyl chloride), polyacrylates and methacrylates, copolymers of vinyl chloride and vinyl acetate, phenolic resins, polyurethanes, poly(vinyl alcohol), polyacrylonitrile, polystyrene, and the like. It is desirable to select a coating solvent that does not substantially disturb or adversely affect the other previously coated layers of the device. Examples of solvents that can be selected for use as coating solvents for the photogenerator layers are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethyl formamide, dimethyl acetamide, butyl acetate, ethyl acetate, methoxyethyl acetate, and the like.

The coating of the photogenerator layers in embodiments of the present invention can be accomplished with spray, dip or wire-bar methods such that the final dry thickness of the photogenerator layer is, for example, from about 0.01 to about 30 microns, and more specifically, from about 0.1 to about 15 microns after being dried at, for example, about 40° C. to about 150° C. for about 15 to about 90 minutes.

Illustrative examples of polymeric binder materials that can be selected for the photogenerator layer are as indicated herein, and include those polymers as disclosed in U.S. Pat. No. 3,121,006, the disclosure of which is totally incorporated herein by reference. In general, the effective amount of polymer binder that is utilized in the photogenerator layer is from about 0 to about 95 percent by weight, and more specifically, from about 25 to about 60 percent by weight, and yet more specifically, from about 40 to about 65 percent by weight of the photogenerator layer.

As optional adhesive layers usually in contact with the hole blocking layer, there can be selected various known substances inclusive of polyesters, polyamides, poly(vinyl butyral), poly(vinyl alcohol), polyurethane and polyacrylonitrile. This layer is, for example, of a thickness of from about 0.001 micron to about 1 micron. Optionally, this layer may contain effective suitable amounts, for example from about 1 to about 10 weight percent, of conductive and nonconductive particles, such as zinc oxide, titanium dioxide, silicon nitride, carbon black, and the like, to provide, for example, in embodiments of the present invention further desirable electrical and optical properties.

There can be selected for the charge transport layer a number of known components including, for example, aryl amines, such as those of the following formula, and which layer is, for example, of a thickness of from about 5 microns to about 75 microns, and more specifically, of a thickness of from about 10 microns to about 40 microns,

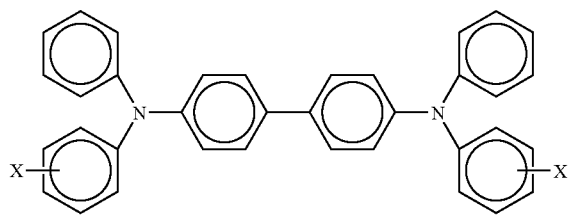

wherein X is an alkyl group, an alkoxy, a halogen, or mixtures thereof, especially those substituents selected from the group consisting of $C_1$ and $CH_3$.

Examples of specific aryl amines are N,N'-diphenyl-N,N'-bis(alkylphenyl)-1,1-biphenyl-4,4'-diamine wherein alkyl is selected from the group consisting of methyl, ethyl, propyl, butyl, hexyl, and the like; and N,N'-diphenyl-N,N'-bis(halophenyl)-1,1'-biphenyl-4,4'-diamine wherein the halo substituent is preferably a chloro substituent. Other known charge transport layer molecules can be selected, reference for example, U.S. Pat. Nos. 4,921,773 and 4,464,450, the disclosures of which are totally incorporated herein by reference.

Examples of the binder materials for the transport layers include components, such as those described in U.S. Pat. No. 3,121,006, the disclosure of which is totally incorporated herein by reference. Specific examples of polymer binder materials include polycarbonates, acrylate polymers, vinyl polymers, cellulose polymers, polyesters, polysiloxanes, polyamides, polyurethanes, poly(cyclo olefins), and epoxies as well as block, random or alternating copolymers thereof. Preferred electrically inactive binders are comprised of polycarbonate resins with a molecular weight of from about 20,000 to about 100,000 with a molecular weight $M_w$ of from about 50,000 to about 100,000 being particularly preferred. Generally, the transport layer contains from about 10 to about 75 percent by weight of the charge transport material, and more specifically, from about 35 percent to about 50 percent of this material.

Specific binders selected for the charge transport layer include the novel polycarbonates illustrates herein. Also disclosed are methods of imaging and printing with the photoresponsive devices illustrated herein. These methods generally involve the formation of an electrostatic latent image on the imaging member, followed by developing the image with a toner composition comprised, for example, of thermoplastic resin, colorant, such as pigment, charge additive, and surface additives, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The following Examples are being submitted to illustrate embodiments of the present invention. These Examples are intended to be illustrative only and are not intended to limit the scope of the present invention. Also, parts and percentages are by weight unless otherwise indicated.

EXAMPLE I

Synthesis of 4,4'-Bis(4-hydroxyphenyl)valerinol

In a dry 12 liter 3-necked flask equipped with a mechanical stirrer, condenser and an addition flask were added 2 liters of fresh tetrahydrofuran under an argon atmosphere. Two grams of LAH were added and the mixture was stirred overnight in order to dry the solvent. After drying, an additional 81.09 grams of lithium aluminum hydride (LAH) were added for a total of 2.19 moles. The resulting bis(phenolic ester (328.2 grams, 1.093 moles)) was dissolved in 3 liters of fresh THF added dropwise over 2 hours during which the reaction mixture became extremely thick, but eventually broke and became freely stirrable. The reaction was allowed to cool to room temperature, about 25° C., and was quenched by the dropwise addition of 550 milliliters of saturated ammonium chloride solution. The granular aluminum-containing solids resulting were then filtered and the solvent removed by rotary evaporation. This afforded 262.5 grams (88.2 percent) of the above valerinol syrupy product sufficient purity for utilization in the next reaction.

EXAMPLE II

Synthesis of 4,4'-Bis(p-hydroxyphenyl)pentyltetrahydropyranyl Ether

In a 2 liter flask were added 164.3 grams (0.63 mole) of the above triol of Example I, 58.63 grams (0.7 mole, 15 percent excess) of 3,4-dihydro-2H-pyran, and pyridinium p-toluenesulfonate in 750 milliliters THF. The mixture was brought to reflux for 4 hours and then cooled to room temperature, about 25° C. After neutralization with a saturated ammonium chloride solution and drying with brine, the mixture was evaporated to dryness. The resulting residue was combined with 300 milliliters of cyclohexane and brought to reflux for a period of one hour. The hot solvent was carefully decanted and the above process repeated a second time with an equal amount of THF solvent. The gummy residue resulting was taken up in 350 milliliters of ethyl acetate and placed in a suitable separatory funnel. The solution was then extracted with 75 milliliters of 0.25M sodium hydroxide a number of times until extraction of the starting material was confirmed by HPLC. Recrystallization from toluene then delivered the desired above titled ether product, mp 131° C. with spectroscopic properties consistent with the chemical structure and with a purity of >98 percent.

EXAMPLE III

Polymer Synthesis

To a 1 liter Morton flask fitted with mechanical stirrer, argon inlet and dropping funnel were added in order 0.120 gram of $BzEt_3NCl$, 5.367 grams of bisphenol Z, 1.782 grams of the compound of Example II and 400 milliliters of dichloromethane. The reaction mixture was stirred at 1,400 rpm and 3.1 grams of NaOH in 100 milliliters water were added. Then, 10.02 grams of bisphenol Z-bischloroformate in 100 milliliters dichloromethane were added over a 5 minute period. After 60 minutes (time 0 is the beginning of the addition of the bischloroformate) 100 milligrams of $Bu_3N$ in 0.5 milliliter dichloromethane were added. The reaction mixture almost immediately turned extremely viscous. After 125 minutes, the stirring was stopped and the phases obtained separated. The organic phase was washed successively with 100 milliliters of a 5 percent HCl solution and 2 ×100 milliliters of water. The polymer product was then precipitated by the addition of the organic solution to 3 liters of vigorously stirred methanol. The polymer was collected and dried overnight, about 18 to about 21 hours, at 60° C. at 10 mmHg. The resulting polymer product of the following formula had a measured $M_w$ of 259 KD (kiloDaltons), 259 KD equals 259,000 Daltons or 259,000 amu (atomic mass units),

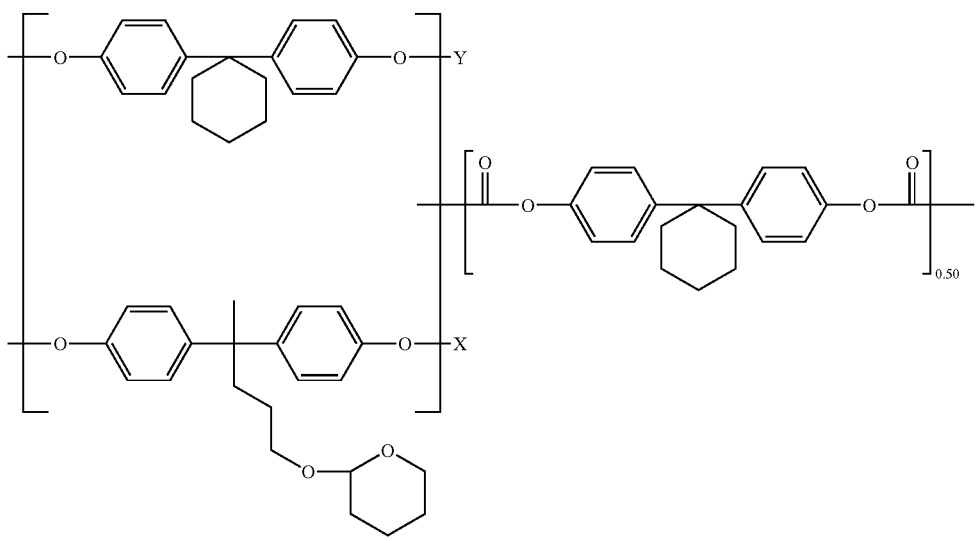

wherein X=0.1 and Y=0.4.

EXAMPLE IV

Polymer Synthesis

To a 1 liter Morton flask fitted with mechanical stirrer, argon inlet and dropping funnel were added in order 0.120 gram of BzEt$_3$NCl, 5.367 grams of bisphenol Z, 0.078 gram of t-octylphenol, 1.782 gram of the compound of Example II and 400 milliliters of dichloromethane. The reaction mixture was stirred at 800 rpm and 3.1 grams of NaOH in 100 milliliters water were added. Then 10.02 grams of bisphenol Z-bischloroformate in 100 milliliters dichloromethane were added over a 5 minute period. After 60 minutes (time 0 is the beginning of the addition of the bischloroformate) 100 milligrams of Bu$_3$N in 0.5 milliliter of dichloromethane were added. After 125 minutes, the stirring was terminated and the various phases obtained separated. The organic phase was washed successively with 100 milliliters of a 5 percent HCl solution and 2×100 milliliters of water. The polymer product was precipitated by the addition of the organic solution to 3 liters of vigorously stirred methanol. The polymer was collected and dried overnight at 60° C. at 10 mmHg; the resulting polymer of the following formula had a measured M$_w$ of 136 KD,

EXAMPLE V

Polymer Synthesis

To a 5 liter Morton flask fitted with mechanical stirrer, argon inlet and dropping funnel were added in order 0.60 gram of BzEt$_3$NCl, 26.835 grams of bisphenol Z, 0.530 gram of t-octylphenol, 8.910 grams of the compound of Example II and 2,000 milliliters of dichloromethane. The resulting reaction mixture was stirred at 800 rpm and 15.5 grams of NaOH in 500 milliliters of water were added. Then 50.14 grams of bisphenol Z-bischloroformate in 500 milliliters dichloromethane were added over a 5 minute period. After 60 minutes (time 0 is the beginning of the addition of the bischloroformate) 0.5 gram of Bu$_3$N in 5 milliliters dichloromethane was added. After 125 minutes, the stirring was stopped and the various phases obtained separated. The organic phase was washed successively with 500 milliliters of a 5 percent HCl solution and 2×500 milliliters of water. The polymer was precipitated by addition of the organic solution to 14 liters vigorously stirred acetone. The resulting rubbery solid was redissolved in 1.2 liters of dichloromethane and precipitated by addition to 16 liters of methanol. The polymer of the following formula was col-

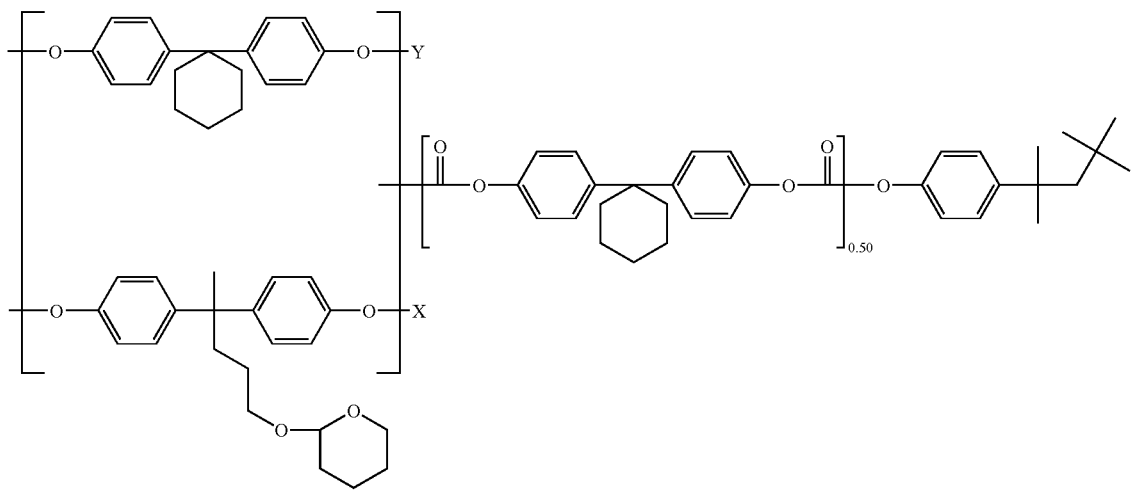

wherein X=0.1 and Y=0.4.

lected and dried overnight, 18 to 21 hours, at 60° C. at 10 mmHg; the resulting polymer had a measured $M_w$ of 105 KD,

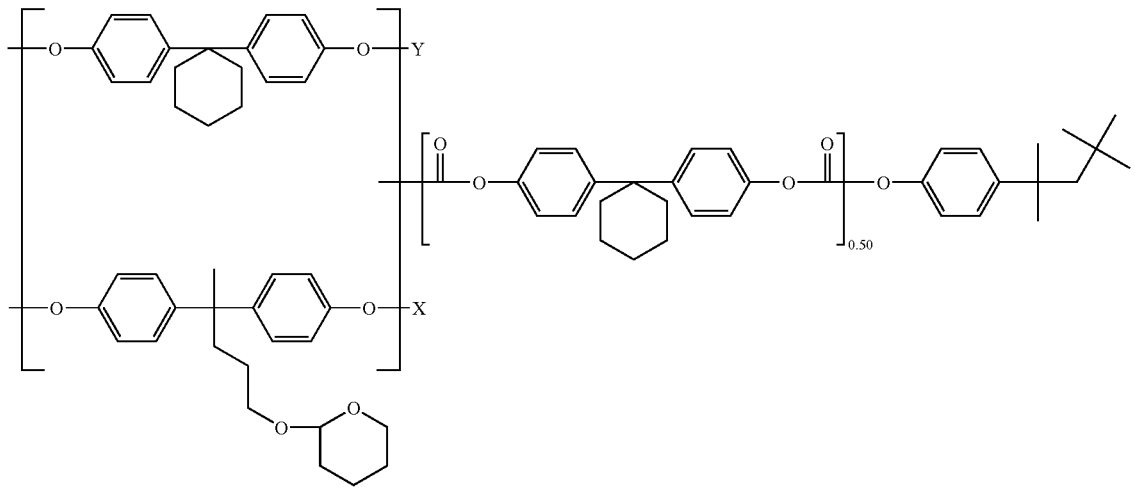

wherein X=0.1 and Y=0.4.

EXAMPLE VI

Polymer Synthesis

To a 3 liter Morton flask fitted with mechanical stirrer, argon inlet and dropping funnel were added in order 0.360 gram of BzEt$_3$NCI, 8.040 grams of bisphenol Z, 0.159 gram of t-octylphenol, 5.346 grams of the compound of Example II, 15.60 grams of N,N'-bis(3-hydroxyphenyl)-N,N'-diphenylbenzidine and 1,200 milliliters of dichloromethane. The resulting reaction mixture was stirred at 800 rpm and 9.3 grams of NaOH in 300 milliliters of water were added. Then 30.08 grams of bisphenol Z-bischloroformate in 300 milliliters dichloromethane were added over a 5 minute period. After 60 minutes (time 0 is the beginning of the addition of the bischloroformate) 300 milligrams of Bu$_3$N in 1.5 milliliters dichloromethane was added. After 125 minutes, the stirring was stopped and the phases obtained separated. The organic phase was washed successively with 1,000 milliliters of a 5 percent HCl solution, 1,000 milliliters of a 1 percent sodium bicarbonate solution, and 2×1,000 milliliters of water. The polymer was precipitated by addition of the organic solution to 10 liters of vigorously stirred methanol. The polymer of the following formula was collected and dried overnight at 60° C. at 10 mmHg; the polymer had a measured $M_w$ of 120 KD,

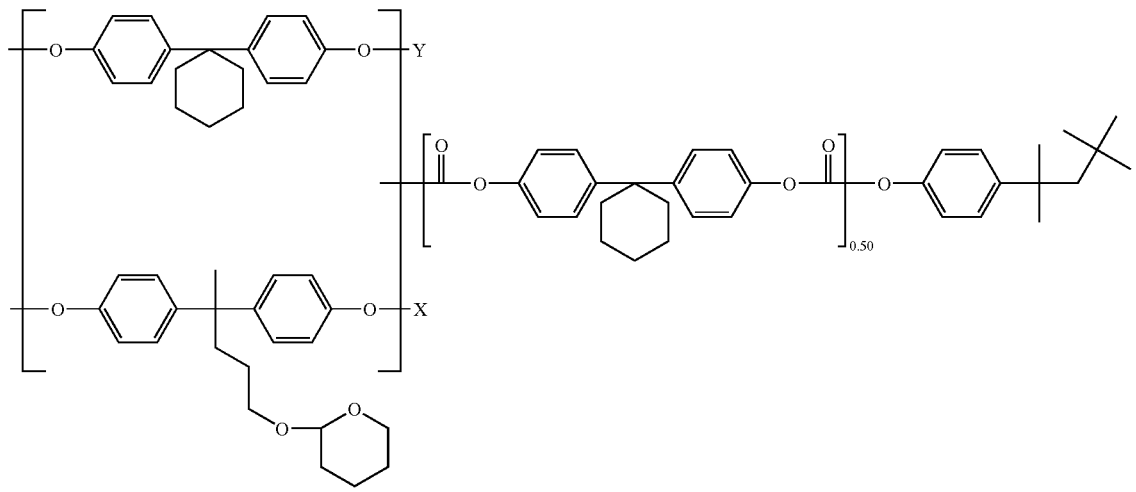

wherein X=0.333 and Y=0.666.

EXAMPLE VII

Deprotection of Polymer

A polymer prepared as in Example VI was freed from its protecting THP ether by transacetalization with methanol in the following manner: In a 2 liter round bottom flask set up for reflux under an inert nitrogen atmosphere were placed 57.6 grams of the polymer product of Example VI, 1 liter of dichloromethane, 115 milliliters of methanol and 1.71 grams (2 mole percent) of pyridinium p-toluene sulfonate (a weak protic acid). The reaction mixture was refluxed for 60 hours, cooled and precipitated into 2.5 liters of methanol. Filtration and drying in vacuo afforded 50.5 grams of polymer of the following formula; the polymer had a measured $M_w$ of 96 KD (polydispersity of 1.71), electrostatically charging the surfaces thereof with a corona discharge source until the surface potentials, as measured by a capacitively coupled probe attached to an electrometer, attained an initial value $V_o$ of about −800 volts. After resting for 0.5 second in the dark, the charged members attained a surface potential of $V_{ddp}$, dark development potential. Each member was then exposed to light from a filtered Xenon lamp with a XBO 150 watt bulb, thereby inducing a photodischarge which resulted in a reduction of surface poten-

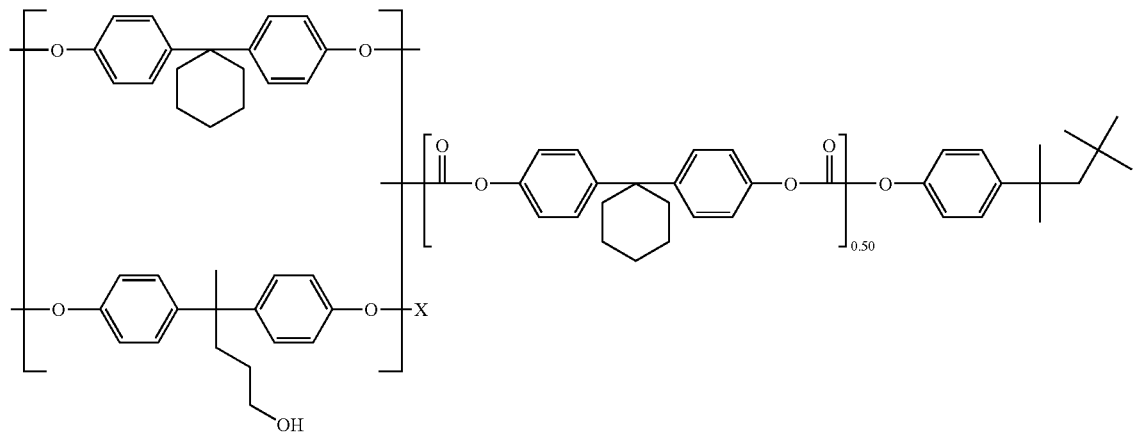

wherein X=0.333 and Y=0.666.

EXAMPLE VIII

A Photoresponsive Imaging Device was Fabricated as Follows

On a 75 micron thick titanized MYLAR® substrate was coated by draw bar techniques a barrier layer formed from hydrolyzed gamma aminopropyltriethoxysilane, and which layer was of a thickness of 0.005 micron. The barrier layer coating composition was prepared by mixing 3 aminopropyltriethoxysilane with ethanol in a 1:50 volume ratio. The coating was allowed to dry for 5 minutes at room temperature, about 25° C. throughout, followed by curing for 10 minutes at 110° C. in a forced air oven. On top of the blocking layer was coated a 0.05 micron thick adhesive layer prepared from a solution of 2 weight percent of an E.I. DuPont 49K (49,000) polyester in dichloromethane. A 0.2 micron photogenerating layer was then coated on top of the adhesive layer from a dispersion of hydroxy gallium phthalocyanine Type V (0.46 gram) and a polystyrene-b-polyvinylpyridine block copolymer binder (0.48 gram) in 20 grams of toluene, followed by drying at 100° C. for 10 minutes. Subsequently, a 25 micron hole transport layer (CTL) was coated on top of the photogenerating layer from a solution of N,N'-diphenyl-N,N-bis(3-methyl phenyl)-1,1'-biphenyl-4,4'-diamine (2.64 grams), and the polymer prepared according to Example VII (3.5 grams), 1,6-diisocyanatohexane (0.088 gram) in 40 grams of dichloromethane. The resulting device or member was dried and cured at 135° C. for 15 minutes to provide an imaging member that exhibited excellent resistance, that is substantially no adverse effects, such as dissolving, in common organic solvents such as, for example, methylenechloride, methanol, or ethanol, and which device was robust and abrasion resistant as determined by a known abrasion test with toner particles.

The xerographic electrical properties of the imaging member can be determined by known means, including tial to a $V_{bg}$ value, background potential. The percent of photodischarge was calculated as $100 \times (V_{ddp} - V_{bg})/V_{ddp}$. The desired wavelength and energy of the exposed light was determined by the type of filters placed in front of the lamp. The monochromatic light photosensitivity was determined using a narrow band-pass filter.

An illustrative wear test on a drum photoreceptor device of the present invention with the above component was accomplished as follows: Photoreceptor wear was determined by the difference in the thickness of the photoreceptor before and after the wear test. For the thickness measurement, the photoreceptor was mounted onto the sample holder to zero the permascope at the uncoated edge of the photoreceptor; the thickness was measured at one-inch intervals from the top edge of the coating along its length using a permascope, ECT-100, to obtain an average thickness value.

The following table summarizes the electrical and the wear test performance of photoconductive members prepared as illustrated above, and wherein CTL represents the charge transport layers; the lower the number, the better and more desirable the wear rate. PCZ is a known polycarbonate binder, and CTL is the charge transport layer.

| DEVICE | $V_{ddp}$ (−kV) | $E_{1/2}$ (Ergs/cm)² | Dark Decay (V @ 500 ms) | Vr (V) | Wear (nm/k cycles) |
|---|---|---|---|---|---|
| Control with PCZ as CTL Binder | 4.87 | 1.11 | 10.3 | 15 | 51.5 |
| Crosslinked Polycarbonate Example VIII and Polycarbonate | 4.84 | 1.33 | 9.5 | 44 | 38.1 |

Lower wear number translates into improved wear resistance.

EXAMPLE IX

A photoresponsive member was prepared and evaluated as in Example VIII with substantially similar results except that N,N'-(3,4-dimethylphenyl)-4-aminobiphenyl (2.64 grams) was used in place of N,N'-diphenyl-N,N'-bis(3-methylphenyl)-1,1'-biphenyl-4,4'-diamine (2.64 grams).

EXAMPLE X

A photoresponsive member was prepared and evaluated as in Example VIII with substantially similar results except that a mixture of N,N'-diphenyl-N,N'-bis(3-hydroxyphenyl)-1,1'-biphenyl-4,4'-diamine (1.32 grams), N,N'-diphenyl-N,N'-bis(3-methylphenyl)-1,1'-biphenyl-4,4'-diamine (1.32 grams) and 1,6-diisocyanatohexane (0.4781 gram) was used in place of N,N'-diphenyl-N,N'-bis(3-methylphenyl)-1,1'-biphenyl-4,4'-diamine (2.64 grams), and 1,6-diisocyanatohexane (0.088 gram), respectively.

EXAMPLE XI

A photoresponsive member was prepared and evaluated as in Example VIII with substantially similar results except that a mixture of N,N'-diphenyl-N,N'-bis(3-hydroxyphenyl)-1,1'-biphenyl-4,4'-diamine (1.32 grams), N,N'-(3,4-dimethylphenyl)-4-aminobiphenyl (1.32 grams) and 1,6-diisocyanatohexane (0.4781 gram) was used in place of N,N'-diphenyl-N,N'-bis(3-methylphenyl)-1,1'-biphenyl-4,4'-diamine (2.64 grams) and 1,6-diisocyanatohexane (0.088 gram), respectively.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A polycarbonate generated from the polymerization of a protected hydroxylated bisphenolic compound, a bisphenol, a monophenolic endcapping agent, a bisphenol haloformate, and a curing compound, and thereafter subjecting the obtained polymer to a reaction with an acidic compound.

2. A polycarbonate in accordance with claim 1 wherein said acidic compound is generated by the neutralization of an organic acid with an organic base, and wherein the curing compound is an isocyanate.

3. A polycarbonate in accordance with claim 2 wherein said neutralization is accomplished in a solvent mixture.

4. A polycarbonate in accordance with claim 1 wherein said acidic compound is selected in a molar amount of about 0.01 to about 10 equivalents relative to the molar amount of protected hydroxylated groups present.

5. A polycarbonate in accordance with claim 4 wherein said acidic compound is selected in an amount of about 0.02 to about 0.05 equivalents.

6. A polycarbonate in accordance with claim 1 wherein said polycarbonate is generated from a bisphenol selected from bisphenol A, bisphenol Z, bisphenol C, bisphenol AP, bisphenol E or mixtures thereof.

7. A polycarbonate in accordance with claim 1 wherein the bisphenol is bisphenol Z; wherein the bisphenol haloformate is bisphenol Z bischloroformate; wherein the monophenolic endcapping agent comprises 4-t-octylphenol, 4-t-butylphenol or 4-methylphenol, and further comprising a hydroxylated charge transport compound of the formula

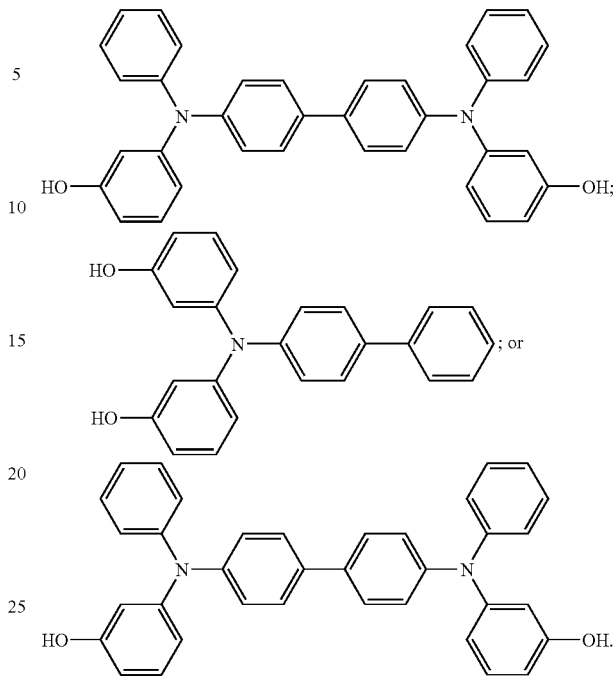

8. A polycarbonate in accordance with claim 1 wherein said bisphenol haloformate is a mixture of bisphenol Z-bischloroformate and bisphenol A-bischloroformate.

9. A polycarbonate in accordance with claim 1 wherein the monophenolic endcapping agent is 4-t-octylphenol, 4-t-butylphenol, 4-methylphenol, or mixtures thereof.

10. A polycarbonate in accordance with claim 7 wherein the hydroxylated charge transport compound is a mixture of charge transporting compounds of the formulas

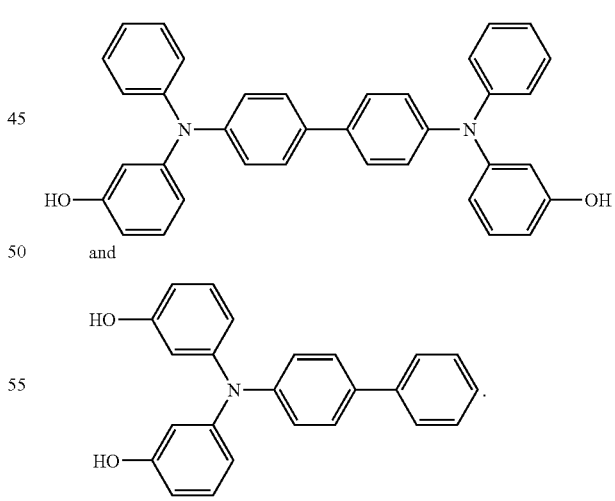

11. A polycarbonate in accordance with claim 1 wherein said polymer resulting possesses a crosslinking percentage of from about 25 percent to about 75 percent.

12. A polycarbonate in accordance with claim 1 wherein said polymer resulting possesses a crosslinking percentage of from about 35 percent to about 55 percent.

13. A polycarbonate in accordance with claim 7 and which polycarbonate is of the formula

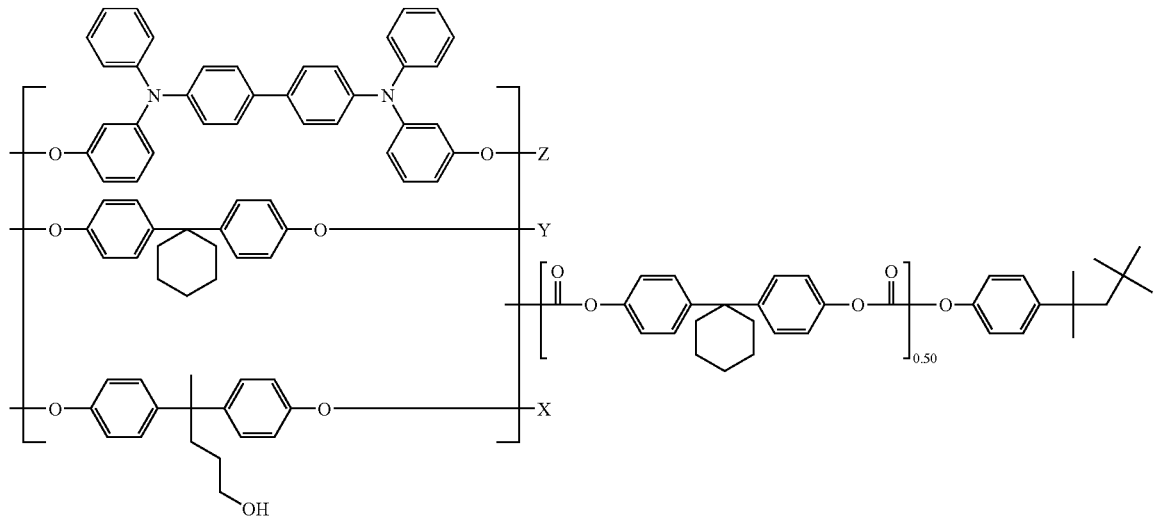

and optionally wherein the sum of X plus Y plus Z is equal to about 0.5.

14. A polycarbonate in accordance with claim 1 possessing a weight average molecular weight ($M_w$) of from about 12,000 Daltons to about 200,000 Daltons.

15. A polycarbonate in accordance with claim 14 and with a $M_w$ of from about 30,000 to about 60,000 Daltons.

16. A polycarbonate in accordance with claim 1 wherein said polymerization is an interfacial polymerization.

17. A polycarbonate in accordance with claim 1 wherein said polycarbonate is generated by interfacial polymerization by mixing bisphenols, monophenolic endcapping agents, hydroxylated charge transporting compounds, and bisphenol haloformates in a mixture of an organic solvent and an aqueous base.

18. A polycarbonate in accordance with claim 1 wherein said polycarbonate is prepared by interfacial polymerization, and where said interfacial polymerization is accomplished during the mixing of a bisphenol selected from bisphenol A, bisphenol Z, bisphenol C, bisphenol AP, bisphenol E or mixtures thereof, a monophenolic endcapping agent selected from 4-t-octylphenol, 4-t-butylphenol or 4-methylphenol, a protected hydroxylated phenolic monomer and a hydroxylated charge transporting compound of

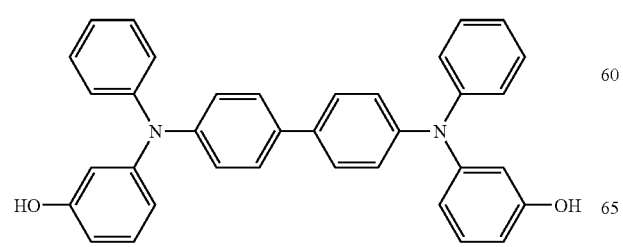

-continued
or

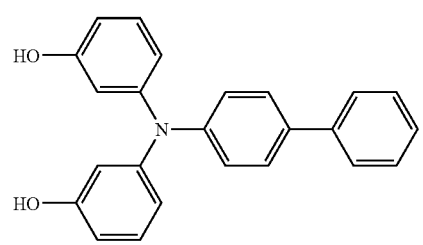

and a bishaloformate compound of bisphenol A-bischloroformate and bisphenol Z-bischloroformate in the presence of an organic solvent of dichloromethane, chlorobenzene, or toluene, and an inorganic base dissolved in water, and wherein said base is sodium hydroxide, potassium hydroxide, rhodium hydroxide or cesium hydroxide and a phase transfer catalyst optionally comprised of triethylbenzylammonium chloride.

19. A crosslinked polycarbonate generated by the interfacial polymerization in dichloromethane of a protected hydroxylated bisphenolic compound of the formula

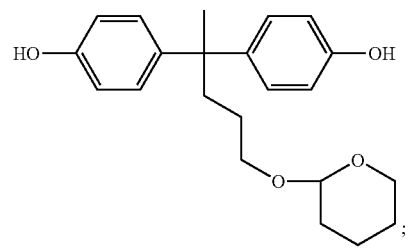
;

a bisphenolic compound of the formula

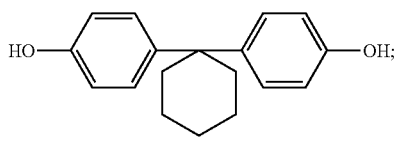

a monophenolic compound of the formula

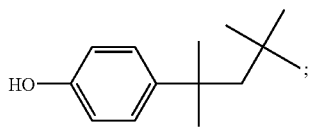

and a bishaloformate compound of the formula

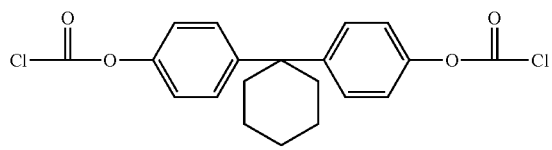

in the presence of an aqueous solution of potassium hydroxide and a catalytic amount of triethylbenzylammonium chloride; subsequently reacting with methanol and pyridium -p-tosylate, and subsequently crosslinking the resulting product with 1,6-diisocyanatohexane.

20. A polycarbonate in accordance with claim 19 wherein the ratio of protected hydroxylated bisphenolic compound and bisphenolic compound is from about 0.05:0.95 to about 0.95:0.05; the molar amount of said monophenolic compound is about 0.01 to about 0.10 moles relative to the amount of total phenolic component used; and the molar amount of said bishaloformate compound is about 1 to about 140 moles relative to the total amount of phenolic component used.

21. A photoconductive imaging member comprised of the polycarbonate of claim 1.

22. A photoconductive imaging member comprised of a charge transport layer containing the polycarbonate of claim 1.

23. A photoconductive imaging member comprised of a charge transport layer containing a charge transport compound or compounds, and as a binder the polycarbonate of claim 1.

24. A polycarbonate in accordance with claim 2 wherein said base is pyridium-p-tosylate, pyridium mesylate, triethylammonium-p-tosylate, or triethylammonium mesylate.

25. A polycarbonate in accordance with claim 3 wherein said solvent mixture is comprised of methanol and dichloromethane.

26. A polycarbonate in accordance with claim 2 wherein said base is comprised of a mixture of an alcohol and either an organic tosylate or an organic mesylate.

27. The polycarbonate of the formula

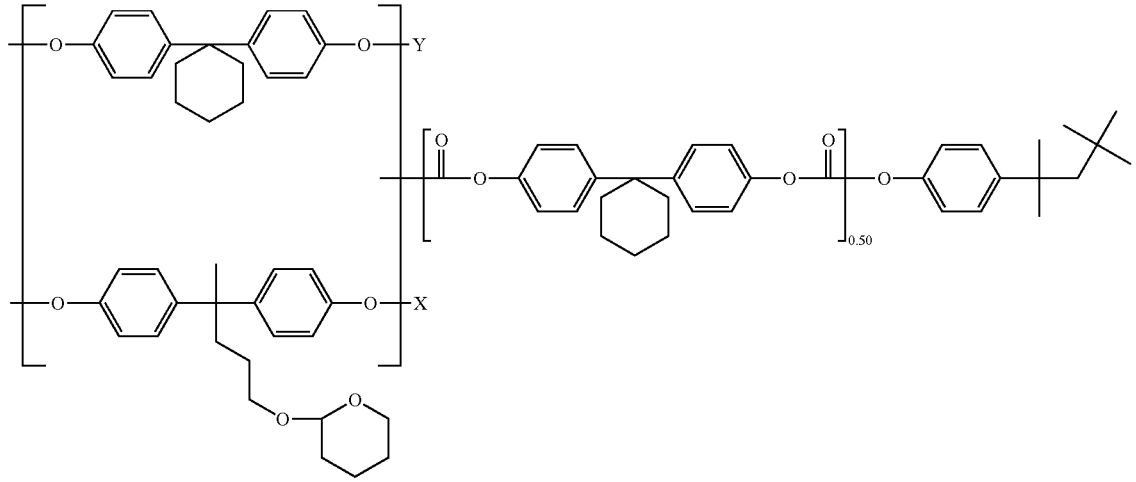

wherein X=0.1 and Y=0.4.

* * * * *